(12) United States Patent
Wang et al.

(10) Patent No.: US 12,511,254 B2
(45) Date of Patent: Dec. 30, 2025

(54) KEY-VALUE STORE AND FILE SYSTEM

(71) Applicants: Lemon Inc., Grand Cayman (KY); Beijing Volcano Engine Technology Co., Ltd., Beijing (CN)

(72) Inventors: Hao Wang, Los Angeles, CA (US); Jiaxin Ou, Beijing (CN); Sheng Qiu, Los Angeles, CA (US); Yi Wang, Beijing (CN); Zhengyu Yang, Los Angeles, CA (US); Yizheng Jiao, Los Angeles, CA (US); Jingwei Zhang, Beijing (CN); Jianyang Hu, Beijing (CN); Yang Liu, Los Angeles, CA (US); Ming Zhao, Beijing (CN); Hui Zhang, Los Angeles, CA (US); Kuankuan Guo, Beijing (CN); Huan Sun, Los Angeles, CA (US); Yinlin Zhang, Los Angeles, CA (US)

( * ) Notice: Subject to any disclaimer, the term of this patent is extended or adjusted under 35 U.S.C. 154(b) by 162 days.

(21) Appl. No.: 18/475,725

(22) Filed: Sep. 27, 2023

(65) Prior Publication Data

US 2024/0086362 A1 Mar. 14, 2024

(51) Int. Cl.
*G06F 16/13* (2019.01)

(52) U.S. Cl.
CPC .................. *G06F 16/134* (2019.01)

(58) Field of Classification Search
None
See application file for complete search history.

(56) References Cited

U.S. PATENT DOCUMENTS

| | | | |
|---|---|---|---|
| 10,761,752 B1* | 9/2020 | Narayanan | G06F 3/0644 |
| 2023/0205440 A1* | 6/2023 | Jo | G06F 3/064 |
| | | | 711/154 |

OTHER PUBLICATIONS

Huang G., et al., "X-Engine an Optimized Storage Engine for Large-scale E-commerce Transaction Processing," Proceedings of the 2020 CHI Conference on Human Factors in Computing Systems, ACMPUB27, New York, NY, USA, Jun. 25, 2019, pp. 651-665 (Year: 2019).*

Lu Z., et al., "p2KVS a Portable 2-dimensional Parallelizing Framework to Improve Scalability of Key-value Stores on SSDs," Proceedings of the Twelveth ACM Conference on Data and Application Security and Privacy, ACMPUB27, New York, NY, USA, Mar. 28, 2022, pp. 575-591. (Year: 2022).*

Extended European Search Report for European Application No. 24193077.5, mailed Jan. 22, 2025, 11 pages.

Huang G., et al., "X-Engine an Optimized Storage Engine for Large-scale E-commerce Transaction Processing," Proceedings of the 2020 CHI Conference on Human Factors in Computing Systems, ACMPUB27, New York, NY, USA, Jun. 25, 2019, pp. 651-665, XP058547316, ISBN: 978-1-4503-6708-0, DOI: 10.1145/3299869.3314041.

(Continued)

*Primary Examiner* — Kannan Shanmugasundaram
(74) *Attorney, Agent, or Firm* — Fish & Richardson P.C.

(57) ABSTRACT

A key-value store and a file system are integrated together to provide improved operations. The key-value store can include a log engine, a hash engine, a sorting engine, and a garbage collection manager. The features of the key-value store can be configured to reduce the number of I/O operations involving the file system, thereby improving read efficiency, reducing write latency, and reducing write amplification issues inherent in the combined key-value store and file system.

20 Claims, 19 Drawing Sheets

(56) References Cited

OTHER PUBLICATIONS

Lu Z., et al., "p2KVS a Portable 2-dimensional Parallelizing Framework to Improve Scalability of Key-value Stores on SSDs," Proceedings of the Twelveth ACM Conference on Data and Application Security and Privacy, ACMPUB27, New York, NY, USA, Mar. 28, 2022, pp. 575-591, XP058847467, ISBN: 978-1-4503-8742-2, DOI: 10.1145/3492321.3519567.

Song N.Y., et al., "Efficient Key-Value Stores with Ranged Log-Structured Merge Trees," 2018 IEEE 11th International Conference on Cloud Computing (Cloud), IEEE, Jul. 2, 2018, pp. 652-659, XP033399895, DOI: 10.1109/Cloud.2018.00090.

\* cited by examiner

KEY-VALUE STORE AND FILE SYSTEM

FIELD

This disclosure is directed to key-value stores and file systems, particularly integrated key-value store and file system combinations for providing cloud computing services.

BACKGROUND

Typical key-value stores, such as existing database systems, use log structured merge trees. These offer rapid data ingestion but can have tradeoffs regarding write amplification, resource contention, relatively poor read performance, and computational overhead.

SUMMARY

This disclosure is directed to key-value stores and file systems, particularly integrated key-value store and file system combinations for providing cloud computing services.

By implementing a key-value separation mechanism reducing write-amplification and resource contention, performance during data write operations can be improved, especially for cloud services dealing with data containing large values (e.g., tens of KB).

Additionally, the key-value storage and file system can include specialized engines to cater to specific data access patterns. The first engine offers hashtable-like read performance, thereby enhancing the overall read efficiency. The second engine is designed to handle data with temporal locality, such as write-ahead logs or raft logs, achieving high-performance data ingestion.

Furthermore, extended tail latencies during data writes can be addressed by optimizing the journal compaction of the underlying file system. This optimization contributes to reduced latencies for write operations, resulting in improved overall system performance. The improvements to overall system performance can include reduced CPU and storage consumption, higher throughputs, and lower latencies.

In an embodiment, a system includes a key-value system, a file system, and a collaboration layer. The key-value system includes a log engine configured to provide concurrent writing of multiple log files, and a hash engine configured to address point queries by storing index information in a compact index. The key-value system further includes a sorting engine configured to address range scans by using partitioned log-structured merge (LSM) trees. The file system includes a log-structured append-only write model. The collaboration layer is configured to facilitate collaboration between the key-value system and the file system.

In an embodiment, the file system is configured to update data based on the key-value system without updating metadata associated with said data.

In an embodiment, the key-value system is configured to provide data to the file system to make said data persistent within the file system.

In an embodiment, the hash engine is configured to retain the compact index in a cache memory. In an embodiment, the index information is compressed. In an embodiment, the index information retained in the cache memory is partial index information selected by removing some of the index information according to a least recently used strategy.

In an embodiment, the log engine is configured to consolidate multiple user operations into a single I/O operation to be performed with the file system. In an embodiment, the consolidation of the multiple user operations includes placing the multiple user operations into a queue, and flushing the queue to the file system on occurrence of a predetermined condition.

In an embodiment, the sorting engine is configured to split data from a first LSM into a plurality of shards, each of the shards containing a second LSM tree having fewer layers than the first LSM tree. In an embodiment, the sorting engine includes a job scheduler, the job scheduler configured to prioritize flush operations and level zero to level one compaction operations. In an embodiment, the sorting engine includes a sharding manager, configured to direct the splitting of data such that each of the second LSM trees have a number of levels that is within a predetermined range. In an embodiment, the sorting engine includes a timestamp manager configured such that level zero or level one applications have timestamp values that strictly increase over time for a same key.

In an embodiment, the key-value system further comprises a garbage collection module configured to merge multiple layers of an LSM tree into a last layer of said LSM tree. In an embodiment, the collaboration layer is configured to coordinate garbage collection operations across the key-value system and the file system. In an embodiment, coordinating the garbage collection operations includes the file system exposing zone usage information to the key-value system, and the key-value system utilizing the zone usage information to determine a file to be subjected to compaction or garbage collection. In an embodiment, the garbage collection module is configured to determine a size of garbage data within a blob file based on an SST file associated with said blob file. In an embodiment, the SST file contains redundant keys at an end of said SST file.

In an embodiment, the file system contains superblock, journal, and data components, the superblock component containing general file system metadata, and the journal containing a checkpoint of a file system operating log.

In an embodiment, the key-value system includes a scheduler configured to schedule background tasks such that each input/output (I/O) request issued by upper layer applications has a consistent I/O amplification.

In an embodiment, the system is configured to handle instant files and general files, wherein the file system allocates storage space for the general files in predefined extents.

DRAWINGS

DETAILED DESCRIPTION

Figure 1:
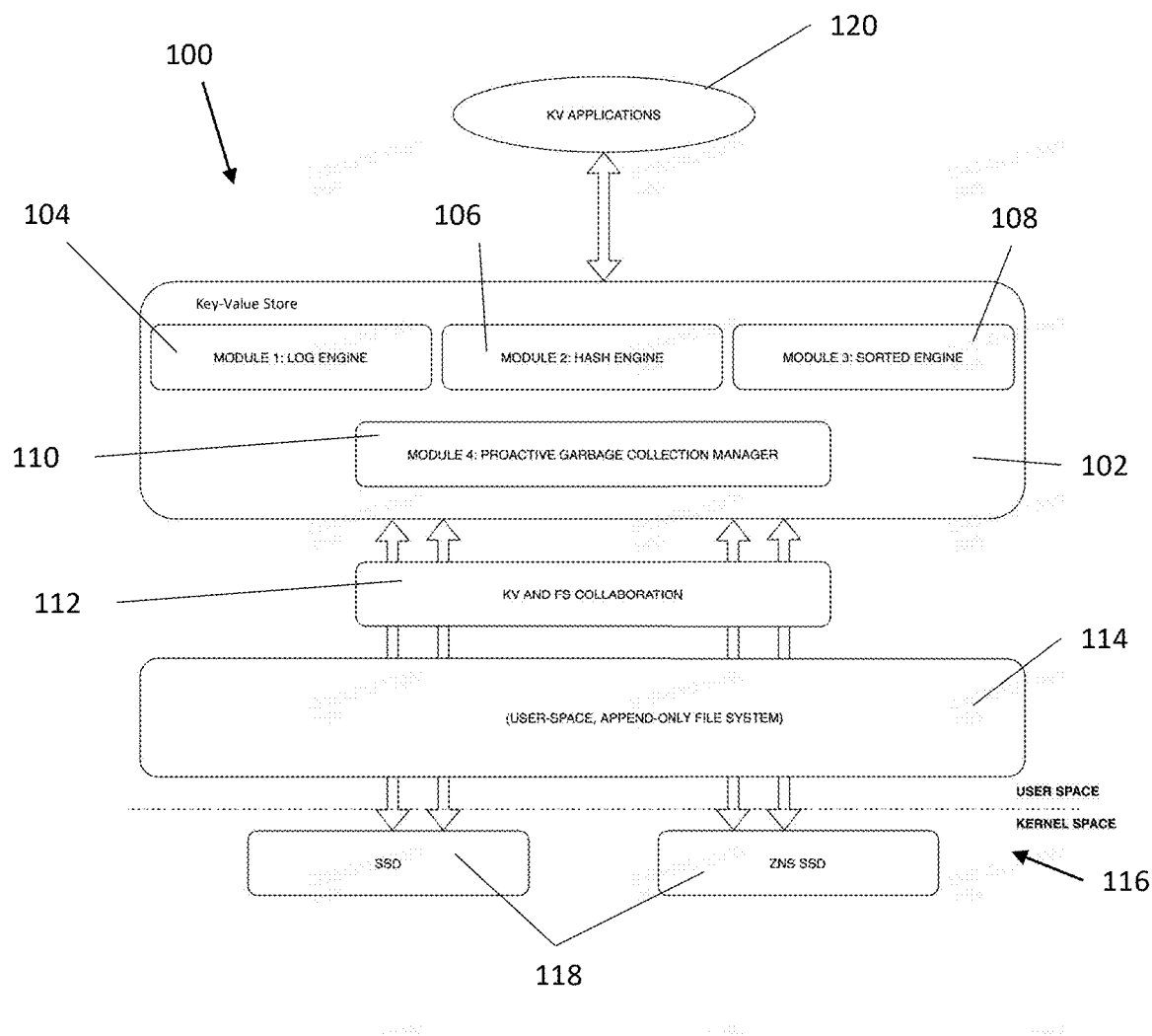
FIG. 1 shows a schematic of a key-value store and file system according to an embodiment.

This disclosure is directed to key-value stores and file systems, particularly integrated key-value store and file system combinations for providing cloud computing services.

In the following detailed description, reference is made to the accompanying drawings, which form a part of the description. In the drawings, similar symbols typically identify similar components, unless context dictates otherwise. Furthermore, unless otherwise noted, the description of a successive drawing may reference features from any previous drawing to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of firmware, software, and/or hardware components configured to perform the specified functions.

FIG. 1 shows a schematic of a key-value store and file system according to an embodiment. Key-value store and file system 100 includes key-value system 102. Key-value system 102 includes a log engine 104, a hash engine 106, a sorting engine 108, and a garbage collection manager 110. Key-value store and file system 100 further includes a collaboration layer 112 and file system 114. Key-value store and file system 100 can interact with a kernel space 116, kernel space 116 including one or more disks 118. The key-value store and file system 100 can interact with applications 120.

Key-value and file system 100 can be used for storage in cloud applications, for example to provide data persistence required by cloud services. Key-value system 102 is configured to provide a key-value store, for example as part of a storage backend for cloud services. Non-limiting examples of cloud services using key-value systems 102 include shopping, social media, metadata management, and the like.

File system 114 can be a dedicated user-level append-only file system configured to provide storage specialized to facilitate operation of key-value system 102.

Log engine 104 is configured to allow concurrent writing of multiple log files, thereby reducing the number of compaction and garbage collection operations. The logs written by log engine 104 can be configured such that strong sorting is not required for handling of said logs. Log engine 104 is configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. Where key-value system 102 and file system 114 are integrated and collaborate, the log engine 104 can be used to store a write-ahead log (WAL) having a predefined structure having a defined actual file size. The defined file size for the WAL can in turn result in requiring fewer I/O operations, thereby enhancing performance while mitigating potential tradeoffs regarding data consistency. The operation of a log engine 104 is further detailed in in FIGS. 4-7 and described below.

Hash engine 106 is configured to handle point queries within the key-value system 102. In particular, hash engine 106 is configured to reduce tail latency in point queries. The hash engine 106 includes separation of data and index components, and maintenance of the index in a cache memory, for example by compression of the index and/or caching of partial data. The partial data can be selected using, for example, a least recently used strategy. The operation of hash engine 106 is further detailed in FIGS. 8 and 9 and described below.

Sorting engine 108 is configured to carry out range scan operations while reducing the write-amplification factor and/or read/write latency associated with such operations. Sorting engine 108 is configured to can use a partitioned log-structured merge (LSM) tree. The classification of I/O flows and scheduling of tasks can further be carried out by sorting engine 108. The operation of a sorting engine 108 is further detailed in FIGS. 8 and 10 and described below.

Garbage collection manger 110 is configured to carry out garbage collection and/or compaction operations in key-value and file system 100. The garbage collection manager 110 can be configured to reduce unnecessary data movement during garbage collection and/or compaction operations in key-value and file system 100. The garbage collection manager 110 can conduct garbage collection and/or compaction operations based on awareness regarding application-side data deletion such as expiration of pages. Garbage collection and compaction carried out by garbage collection manager 110 can be configured to arrange the data to support other modules such as sorting engine 108. The garbage collection manager 110 can coordinate preservation of data during the garbage collection and/or compaction operations. The operation of a garbage collection manager 110 is further detailed in FIGS. 11-13 and described below.

Collaboration layer 112 is configured to facilitate collaboration between key-value system 102 and file system 114. Collaboration layer 112 can further facilitate efficient compaction and/or garbage collection operations in key-value system 102 based on the collaboration between the key-value system 102 and file system 114. The collaboration can reduce write amplification issues arising from compaction and/or garbage collection operations. In an embodiment, the collaboration layer 112 can expose zone usage information from key-value system 102 to the file system 114.

File system 114 can be configured to split data from logs and use log-structured append-only writing as the write model. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system 114 can be configured to support general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

The file system 114 can include a user-space I/O scheduler to assign I/O priority to different I/O types. The I/O scheduler will mark foreground I/O as high priority while background I/O will be marked as low priority. In addition, the key-value system 102 can include a scheduler to schedule its background tasks in order to ensure that each I/O issued by the upper layer applications has a consistent I/O amplification. Through this co-design of I/O scheduling in both key-value system 102 and file system 114, the tail latency can be kept stable and low as both the I/O amplification and I/O latency are consistent. Moreover, reading general files from the file system requires no I/O for metadata, and use of large spaces for the general files can ensure that most read operations require a single I/O.

Kernel space 116 can contain disks 118. Disks 118 can include one or more storage media, such as solid state drives (SSDs). In an embodiment, at least some of disks 118 are zoned storage (ZNS) SSDs.

Applications 120 are any suitable applications utilizing the key-value and file system 100, for example, online shopping, social media, metadata management applications, or the like. The applications 120 can interface with key-vale and file system 100 through any suitable application programming interface (API). In an embodiment, the API can be specific for the particular type of file, for example having the nature of the files as general files or instant filed be determined by the API through which the file has been received.

Figure 2:
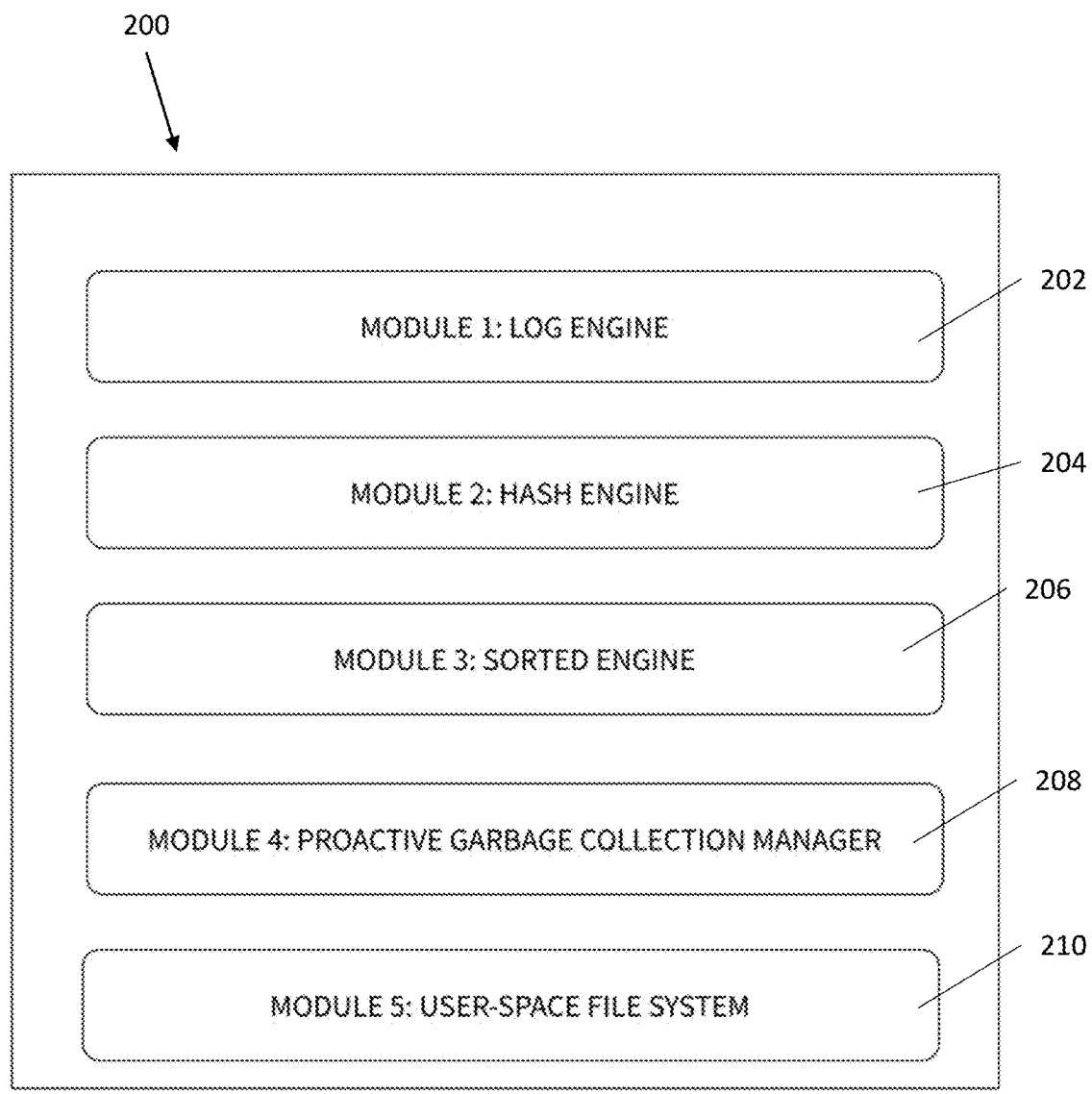
FIG. 2 shows modules of a key-value store and file system according to an embodiment.

FIG. 2 shows modules of a key-value store and file system according to an embodiment. Key-value store and file system 200 includes log engine 202, hash engine 204, sorting engine 206, garbage collection manager 208, and file system 210.

Log engine 202 is configured to allow concurrent writing of multiple log files, thereby reducing the number of compaction and garbage collection operations. The logs written by log engine 202 can be configured such that strong sorting is not required for handling of said logs. Log engine 202 is configured to improve throughput performance issue in log writes and increase recovery speed by reducing the sync write overhead of logs from multiple input/output (I/O) operations to a single I/O operation, aggregating writes using a lock-free queue to control latency and improve throughput, and/or providing asynchronous interfaces to enhance the thread model. The operation of a log engine 202 is further detailed in in FIGS. 4-7 and described below.

Hash engine 204 is configured to handle point queries within the key-value and file storage system 200. In particular, hash engine 204 is configured to reduce tail latency in point queries. The hash engine 204 includes separation of data and index components, and maintenance of the index in a cache memory, for example by compression of the index and/or caching of partial data. The partial data can be selected using, for example, a least recently used strategy. The operation of hash engine 204 is further detailed in FIGS. 8 and 9 and described below.

Sorting engine 206 is configured to carry out range scan operations while reducing the write-amplification factor and/or read/write latency associated with such operations. Sorting engine 206 is configured to can use a partitioned log-structured merge (LSM) tree. The classification of I/O flows and scheduling of tasks can further be carried out by sorting engine 206. The operation of a sorting engine 206 is further detailed in FIGS. 8 and 10 and described below.

Garbage collection manager 208 is a proactive garbage collection manager for key-value store and file system 200. Garbage collection manager 208 can be configured to reduce unnecessary data movement during garbage collection and/or compaction operations in key-value and file system 200. The garbage collection manager 208 can conduct garbage collection and/or compaction operations based on awareness regarding application-side data deletion such as expiration of pages. Garbage collection and compaction carried out by garbage collection manager 208 can be configured to arrange the data to support other modules such as sorting engine 206. The garbage collection manager 208 can coordinate preservation of data during the garbage collection and/or compaction operations. The operation of a garbage collection manager 208 is further detailed in FIGS. 11-13 and described below.

File system 210 can be an append-only file system for key-value storage. File system 210 can be configured to split data from logs and use log-structured append-only writing as the write model. In an embodiment, the file system 210 can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

Figure 3:
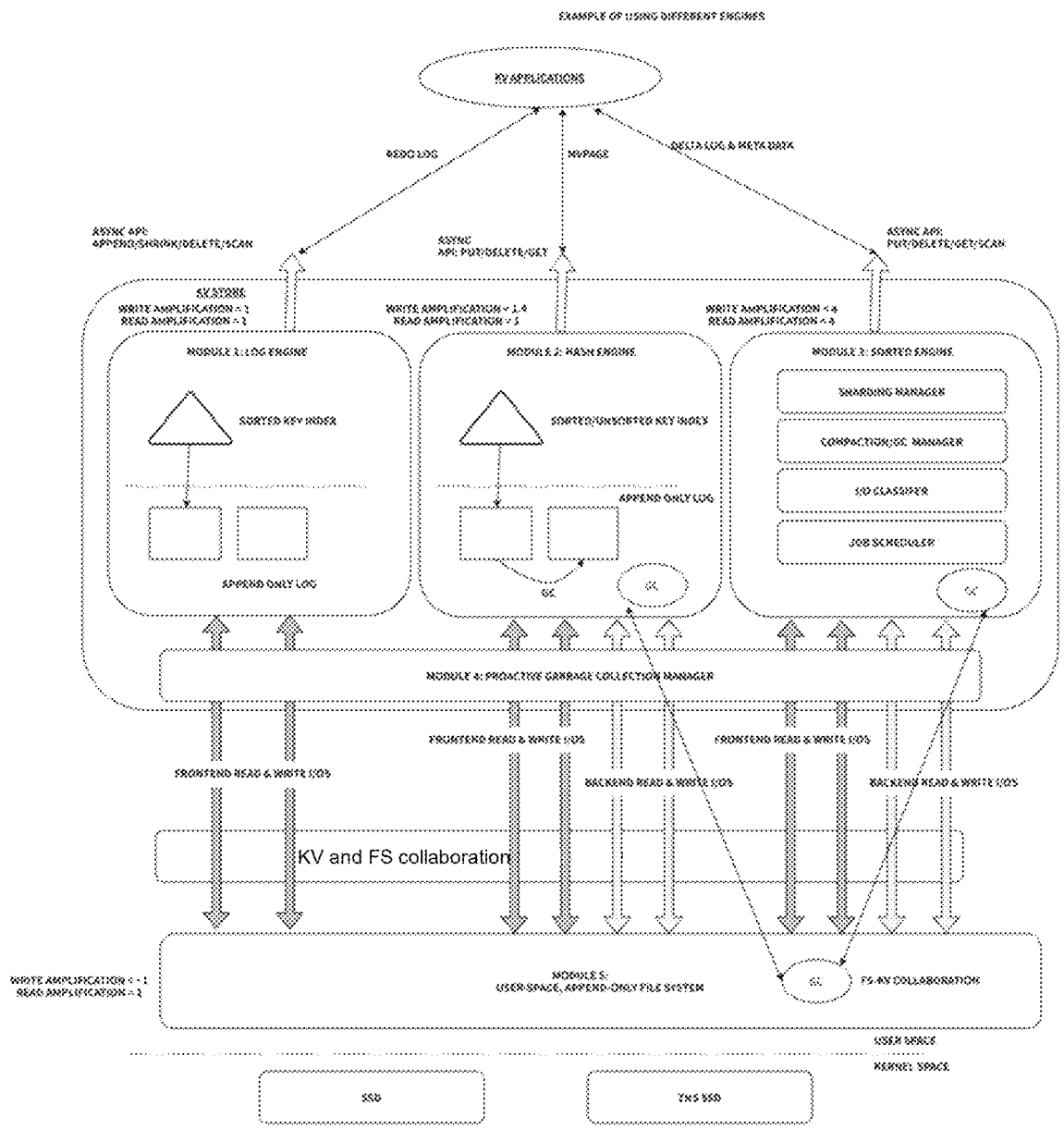
FIG. 3 shows a key-value store and file system handling a plurality of I/O flows according to an embodiment.

FIG. 3 shows a key-value store and file system handling a plurality of I/O flows according to an embodiment. FIG. 3 shows the utilization of the modules shown in FIGS. 1 and 2 and further described herein. In the embodiment shown in FIG. 3, the key-value store and file system is interfacing with a MySQL compatible OTLP database's pageserver. The interface with a MySQL compatible OTLP database's pageserver is a non-limiting example of one suitable application for interfacing with the key-value store and file system according to an embodiment. As shown in FIG. 3, the database pageserver utilizes the key-value store and file system to store each of a base page, an MVPage, a delta log, and a redo log. The key-vale and file system can index and make persistent the redo logs from the database pageserver using the log engine. These operations can have read and write amplifications each of 1. The MVPage can be handled utilizing the hash engine. Delta log and meta data can each be handled utilizing the sorting engine.

Figure 4:
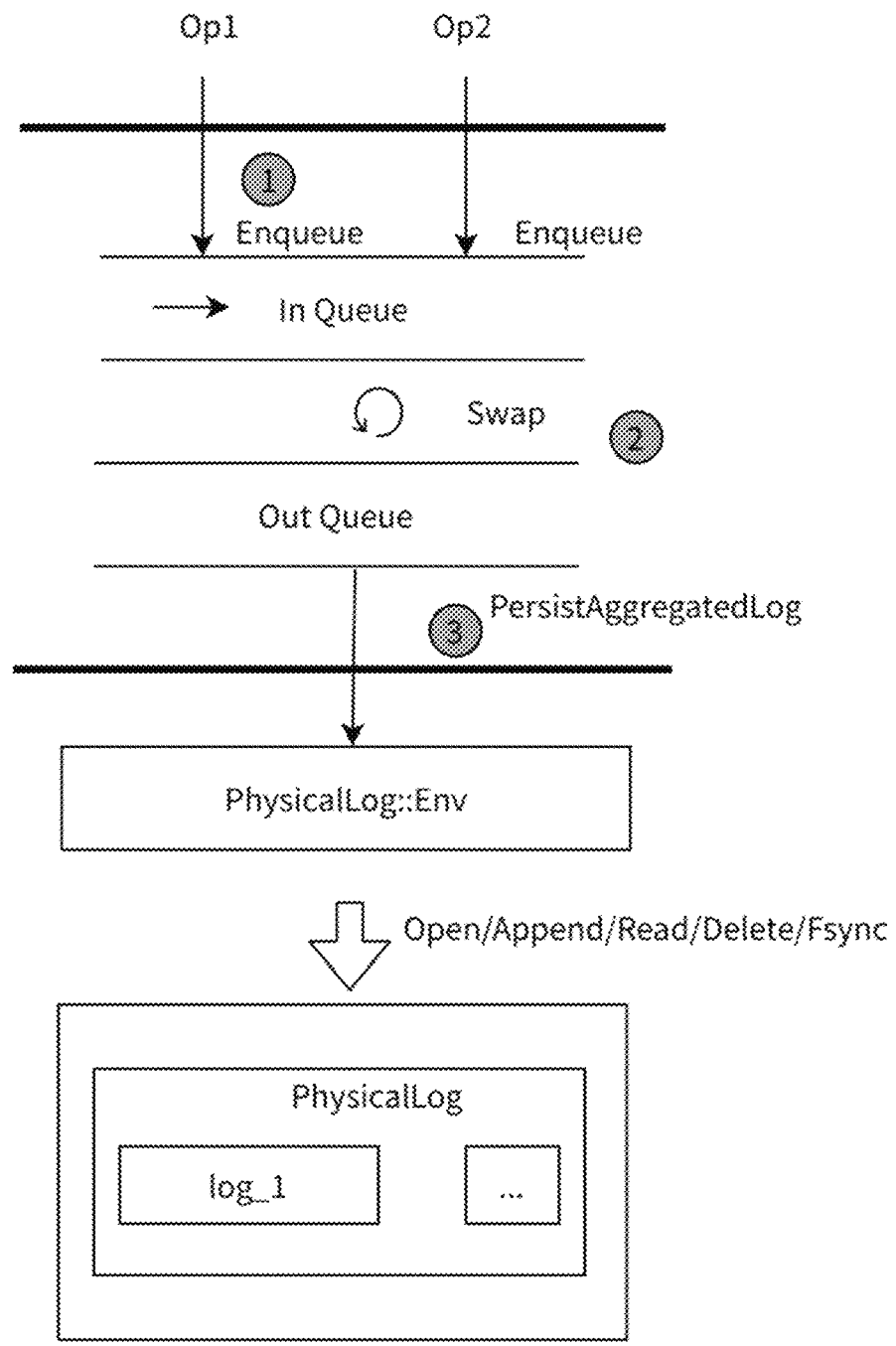
FIG. 4 shows a design of a log engine for shared logs according to an embodiment.

FIG. 4 shows a design of a log engine for shared logs according to an embodiment. The log engine is configured to store log data in upper-layer software, for example in a database software. The log engine can provide two interface classes, LogFile, and LogFileFactory. The LogFile class is configured to act as a file descriptor, and the LogFileFactory class is configured to function as the file system. The log engine is configured such that random writes on SSDs are reduced. The reduction of random writes to the SSDs reduce tail latencies and improve the efficiency of managing in-memory file metadata updates. Operations can be ordered using unique sequence numbers, thereby ensuring order on the disk. High reliability is achieved through cyclic redundancy check protection for the log files. The redundancy check protection provided by the log engine can enable error recovery in upper-layer software. The log engine can be configured to aggregate log data and implement a lock-free queue. The queuing in the log engine can reduce user thread blocking. Additionally, the log engine can save in-memory metadata to the underlying file system through a background thread when it reaches a certain size, resulting in efficient use of data memory usage. In an embodiment, the efficient data memory usage can be represented by a data memory usage ratio of approximately 0.1% or less.

The log engine as shown in FIG. 4 can include a user interface manager configured to receive the user requests, such as Op1 and Op2 shown in FIG. 4, for example by way of synchronous or asynchronous APIs. The log engine can further include an internal layer configured to manage metadata, shared logs, and background tasks. The log engine as shown in FIG. 4 additionally includes a backend layer configured to interface with a file system, for example by writing logs to the physical log in order to make those logs persistent. The log engine shown in FIG. 4 is configured to create a shared log, which can consolidate multiple user operations. Non-limiting examples of such user operations include append, create, delete, trim, and truncate operations. These consolidated operations can be handled with a single I/O request to the file system, thereby allowing the number of overall I/O requests to be reduced. In particular, the received operations go from the enqueue state to an In Queue of the internal layer. The internal layer is configured to swap the In Queue with an Out Queue under particular conditions, such as the availability of background threads, at which point the Out Queue can flush all previous contents of the In Queue to the file system, thereby making the various requests in a current In Queue persistent in the file system through a single I/O operation.

In embodiments, multiple instances of shared logs can be used to manage different forms of data, such as user data, metadata, and other files. The user data can be the log data stored by the log engine. Metadata for improving read operations can also be included in instances of shared logs within the log engine. Metadata management can include one or both of an in-memory metadata storage module using a standard map, and persistent metadata storage on a storage memory. The persistent metadata storage can take the form of, for example a log-structured merge (LSM)-like format. Metadata management within the log engine is described below and shown in FIG. 6.

Figure 5:
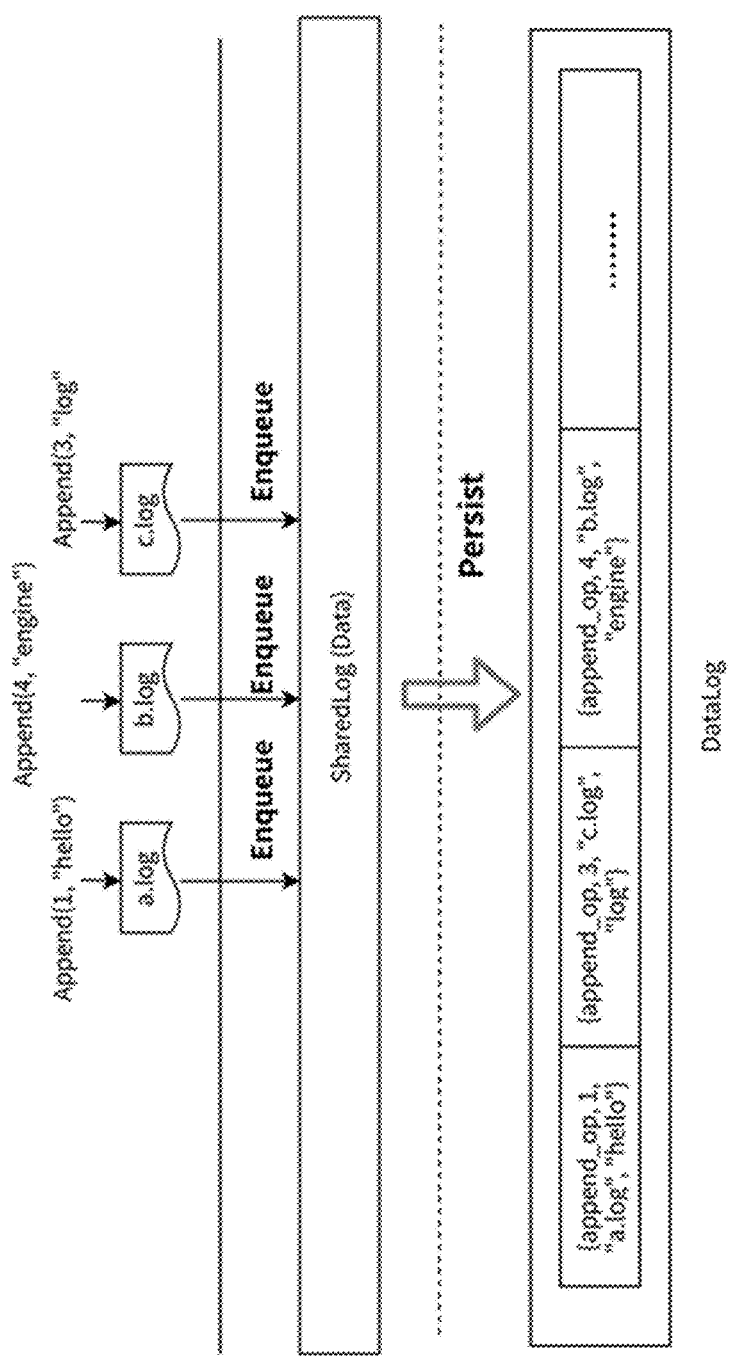
FIG. 5 shows data management for shared logs according to an embodiment.

FIG. 5 shows data management for shared logs according to an embodiment. As shown in FIG. 5, clients request three separate "append" operations. The log engine receives these operations at the enqueue. From the enqueuer the operations are added to the shared log as described above regarding FIG. 4, packaging the received user operations into log records and awaits background threads to flush all the requests to disk, making the log updates persistent as shown in DataLog, where the respective records each include the corresponding requested appending.

Figure 6:
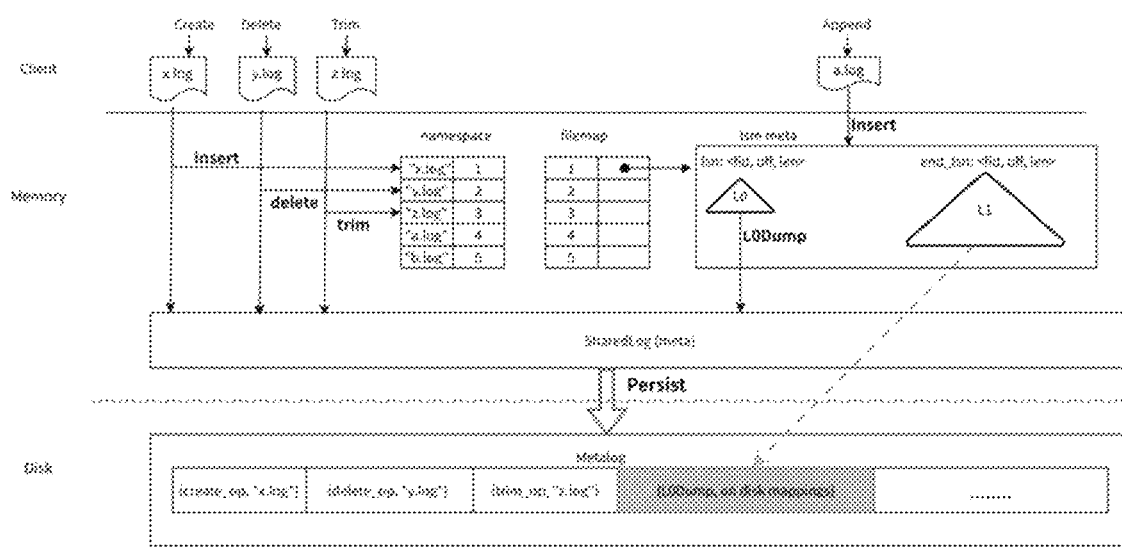
FIG. 6 shows metadata management according to an embodiment.

FIG. 6 shows metadata management according to an embodiment. In particular, FIG. 6 shows append, create, delete, and trim requests from the client, and operations in memory and the disk in response to said requests. The metadata management can be performed by the log engine as described above and shown in FIGS. 4 and 5. Metadata management can include managing namespaces and filemaps of the file system, handling memory metadata for each log file, and implementing the mechanism for metadata persistency by writing to disk. The namespace can maintain the mapping of file names to file identifiers, while the filemap can track the mapping of fid to persistent metadata instances such as the LSM-format metadata discussed above with respect to FIG. 4. Each LSM meta instance can maintain mapping of a log sequence number (LSN) to a location of log records in the underlying file system (e.g., lsn: <fid, offset, lsn>). An LSM meta instance can include level 0 (L0, direct index) and level 1 (L1, indirect index) parts in memory.

For an append operation, a corresponding entry is added to the respective logfile's metadata. In an embodiment, each such entry is recommended to be at or about 24B in size, thereby accounting for about 3% of the total data with a 1k record size. As the log data grows, the memory occupied by metadata can grow significantly, for example approaching 30 GB of metadata for a 1T disk. Accordingly, storing all logfile metadata in memory can become infeasible. Instead, the log engine can periodically write the log file metadata to disk to make the log file metadata persistent. The making persistent of log file metadata can be the access pattern involving frequent writes and infrequent reads, with a high probability of reading recently written data. To address this, the log engine can maintain the latest metadata entries in memory, writes older entries to disk, and employs an indirect map table in memory to point to the on-disk metadata entries.

Figure 7:
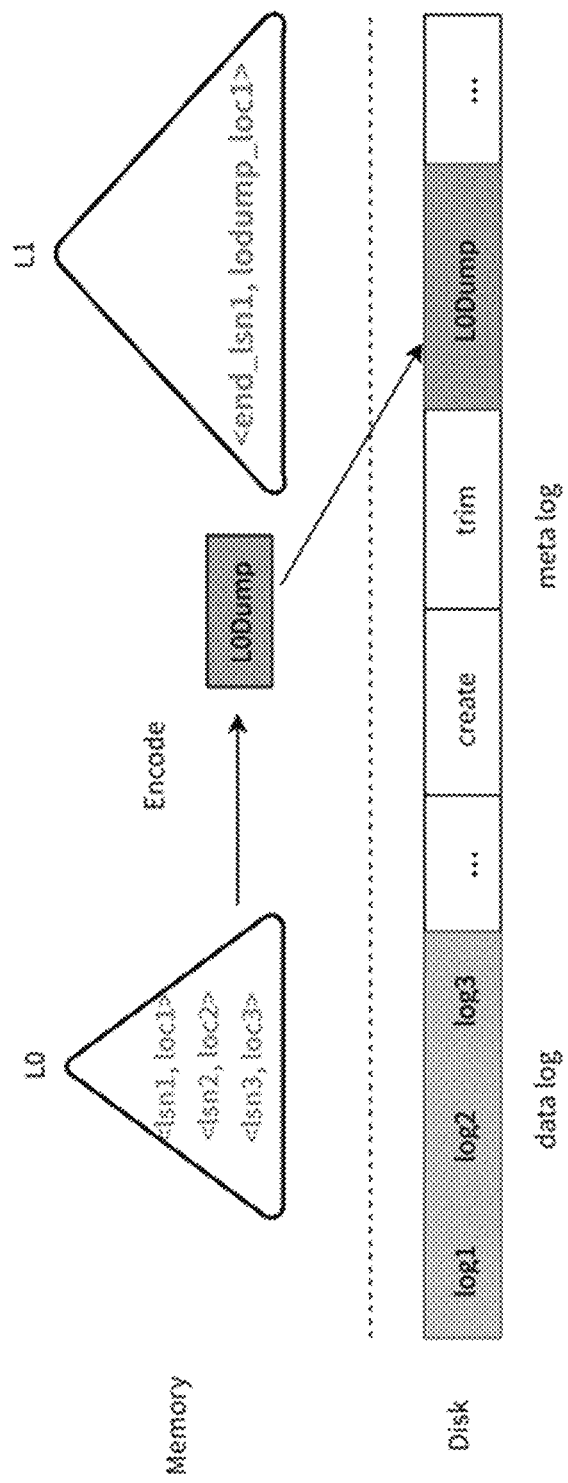
FIG. 7 shows making metadata persistent to a disk according to an embodiment.

FIG. 7 shows making metadata persistent to a disk according to an embodiment. The making persistent of the metadata can include log file creation and/or deletion. The making persistent of the metadata can include modifications to the namespace and filemap, trimming log files, requiring actions on LSM meta for efficient metadata management, and/or the "L0Dump" operation, which involves making L0 mapping persistent by writing said L0 mapping to disk and saving the on-disk location of said L0 mapping in L1.

Figure 8:
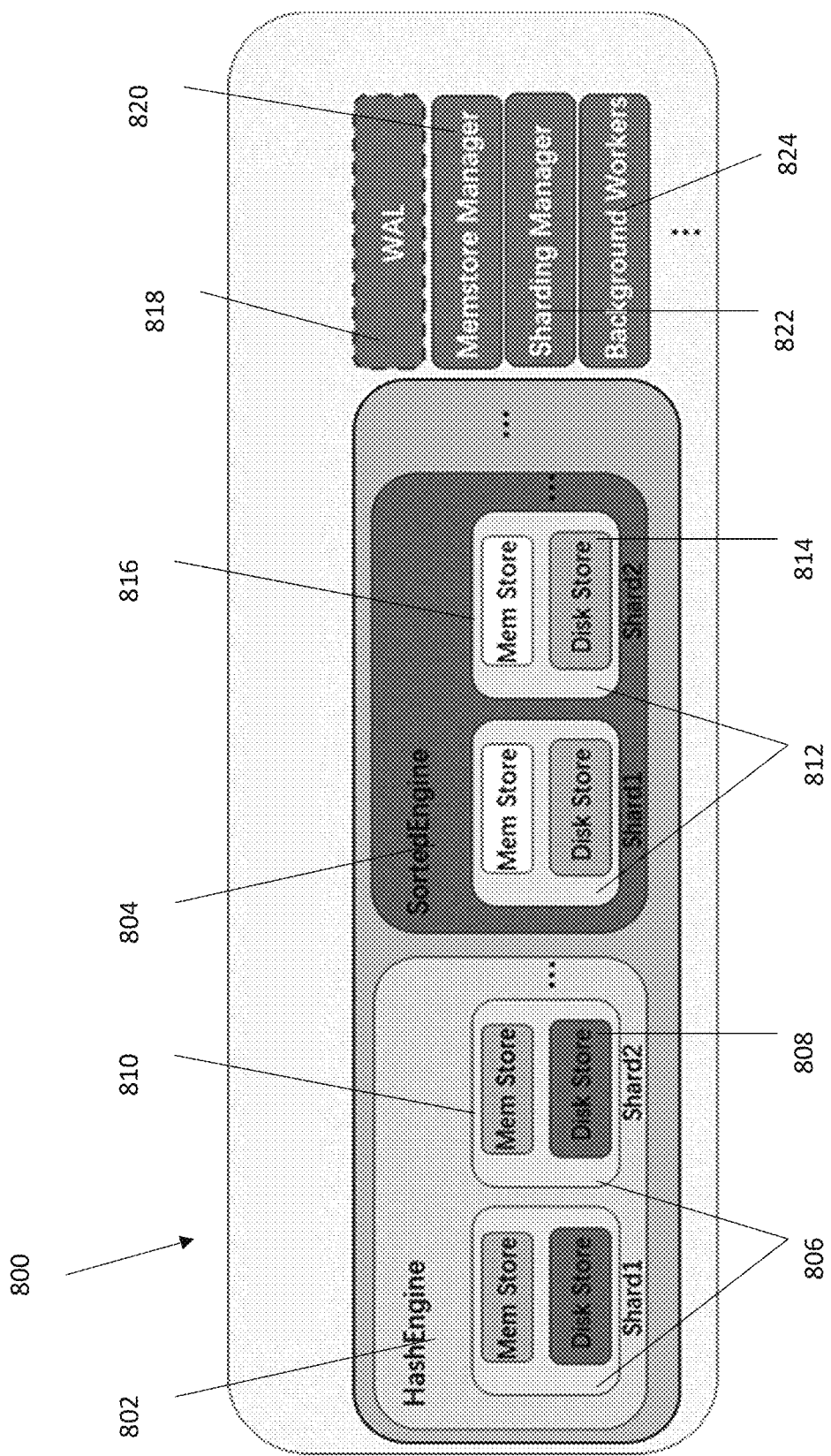
FIG. 8 shows hash and sorting engines according to an embodiment.

FIG. 8 shows hash and sorting engines according to an embodiment. Combined engines 800 include hash engine 802 and sorting engine 804. Hash engine 802 includes hash engine shards 806, each including a memory store 808 and a disk store 810. Sorting engine 804 includes sorting engine shards 812, each including a memory store 814 and a disk store 816. The combined engines 800 further include write-ahead log (WAL) 818, memstore manager 820, sharding manager 822. The combined engines 800 can further include background workers 824 to run background tasks of the system including combined engines 800, for example compaction and/or garbage collection.

Combined engines 800 include hash engine 802 for addressing point queries and sorting engine 804 for conducting range queries.

Hash engine 802 is configured to address point queries. In an embodiment, hash engine 802 is configures to separate index and data components, and to store the index components in a cache memory. The index components can be stored in cache memory through compression, such as CritBitTrie compression and/or caching of partial data, such as data selected using a least recently used (LRU) strategy to identify the data most likely to be queried, such that a hit ratio for the index in cache memory can be maximized. Hash engine 802 can be further configured such that in the event of a cache miss, where the index data relevant to the point query is not in the cache memory, to require a minimum number of disk I/O requests to respond to the query. In an embodiment, hash engine 802 can require no more than one disk I/O request to respond to the query when a cache miss occurs.

Hash engine 802 can be divided into hash engine shards 806, each hash engine shard including memory store 808 and a disk store 810. Memory store 808 is a cache memory configured to store the index data, for example compressed index data or index data selected using the LRU strategy so as to fit within the memory store 808. Disk store 810 is persistent storage configured to contain blob files and blob file indexes. The blob files can be referenced to respond to point queries, for example according to index data from memory store 808 when there is a cache hit. When there is a cache miss, the blob file indexes can be referenced to obtain the required index information through a minimum number of I/O operations accessing disk store 810.

Sorting engine 804 is configured to respond to range queries. The sorting engine 804 is configured to reduce read-write latency and write amplification associated with responding to the range queries. Sorting engine 804 can include classification and corresponding scheduling of I/O tasks to reduce said read-write latency. Sorting engine 804 can further include partitioning of LSM trees of the database to reduce the layers of such trees, reducing write amplification. In an embodiment, the partitioning of LSM trees can be performed by sharding manager 822. Further, sorting engine itself can include sorting engine shards 812. Each of sorting engine shards 812 can include a respective memory store 814 and disk store 816 for the respective partition of the LSM tree and the data thereof. Further detail regarding an example of sorting engine 804 is provided in FIG. 10 and described below.

Write-ahead log (WAL) 818 can provide a log where data write operations can be performed in secure storage prior to making permanent changes to a database through said data write operations. The WAL 818 can provide greater security and durability, improving recovery in the event of a crash.

Memstore manager 820 is a module for memory management for one or both of hash engine 802 and sorting engine 812. Memstore manager 820 can include any suitable hardware, software, and combinations thereof for performing the management of memory as described herein. Memstore manager 820 can include controls of caching for the hash engine 802, Sharding manager 822 controls sharding of the hash engine 802 and sorting engine 804 into the respective shards 806, 812. The sharding manager 822 can be configured organize the respective shards 806, 812 so as to provide data isolation. Data isolation can reduce unnecessary copying during garbage collection. Further, the sharding manager 822 can organize the shards 806, 812, such that shard has its own index management. By dividing the shards 806, 812 so as to simplify index management, the sharding manager can thereby reduce index overhead and reduce required computational resource to accommodate said index overhead. Sharding manager 822 can further control the sharding of the hash engine 802 and/or sorting engine 804 to control resource requirements so as to support multi-tenant operations. Sharding manager 822 can further perform the partitioning of LSM trees of the database to reduce write amplification for the sorting engine 804.

Figure 9:
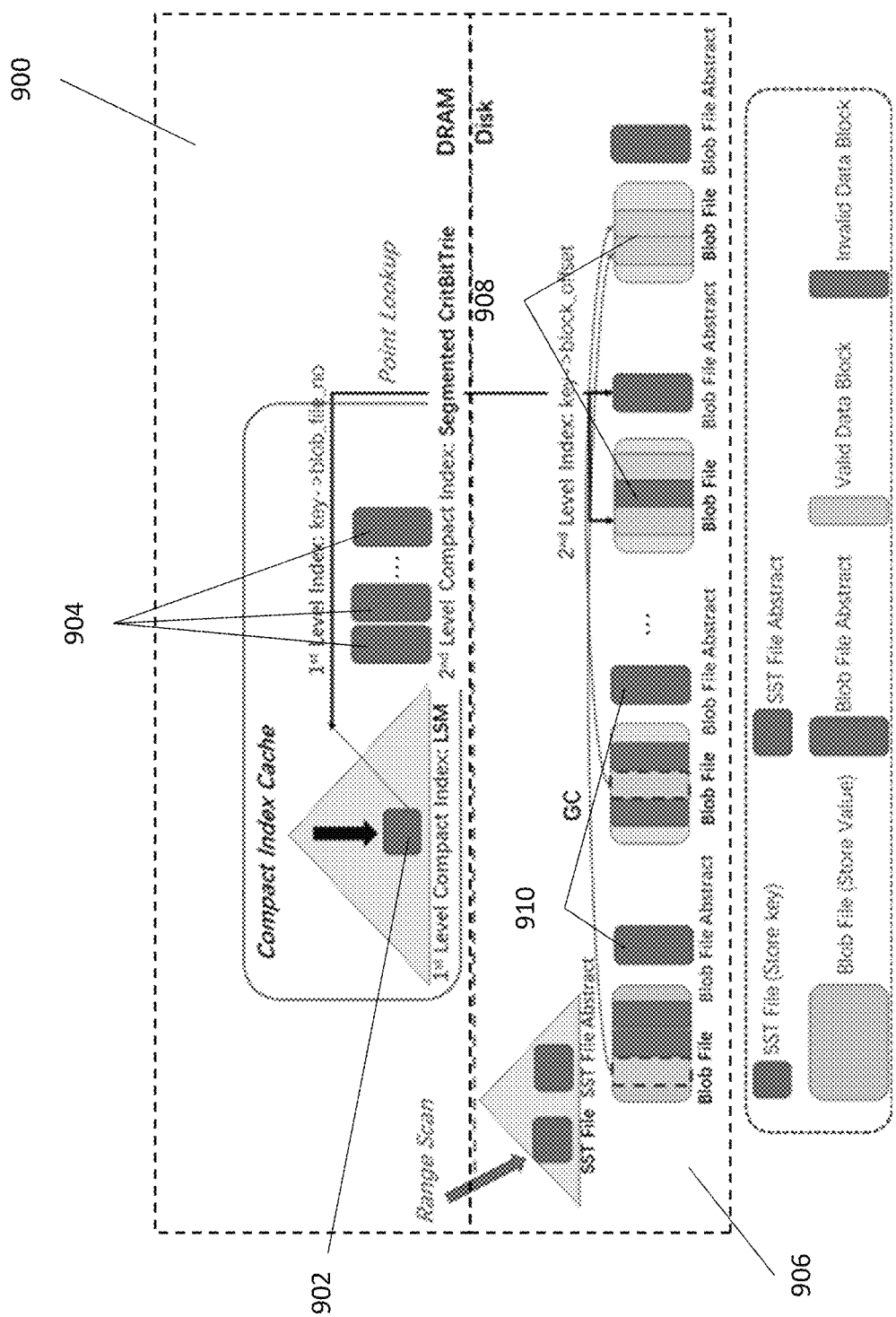
FIG. 9 shows a hash engine according to an embodiment.

FIG. 9 shows an index structure for a hash engine shard according to an embodiment. Cache memory 900 contains a first level compact index 902 and one or more second level compact indexes 904. A storage memory 906 contains blob files 908 each having a blob file abstract 910.

Cache memory 900 is a cache memory, separate from storage memory 906. Cache memory 900 can include one or more suitable memory devices for cache operations, such as dynamic random access memory (DRAM), persistent memory (PMEM), one or more SSDs such as NVMe SSDs, or the like. The cache memory is configured to store a compact index. In an embodiment, the compact index can be accessed without requiring the accessing of storage memory 906. The compact index can contain key values obtained from separation of said key values from data components in the blob files 908. In an embodiment, the key-value separation mechanism utilizes a LSM tree structure, providing benefits such as block-level disk indexing and compressed data blocks for reduced index overhead. In an embodiment, the compact index can identify data responsive to a point query without requiring access to the storage memory 906. The compact index stored in cache memory 900 can include a first level compact index 902 and second level compact index 904.

First level compact index 902 maps keys to blob file numbers (blob_file_no) of the blob files 908. The first level compact index can be stored in any suitable file, for example residing in an SST file. Each SST file can have an associated SST file abstract, which can contain the first-level compact index 902. The first level compact index 902 can be organized according to an LSM tree structure, receiving the results of the key-value separation in LSM tree form and being stored accordingly.

Second level compact indexes 904 map keys to block offsets (block_offset) within the blob file 908. Each blob file 908 can have a corresponding blob file abstract 910 containing the offsets referred to by the respective second-level compact index 904. For the second-level compact indexes 904, a blob file abstract 910 can be generated for each corresponding blob file 908 to store the offsets corresponding to each second level compact index 904.

Storage memory 906 is a memory configured to store the data of the database, such as the blob files 908. Storage memory 906 can be any suitable storage memory such as one or more PMEM, SSDs, hard disk drives (HDDs), combinations thereof, or the like. Blob files 908 are binary large objects, such as chunks of binary data, for example binary data encoding large objects such as, as non-limiting examples, video, audio, images, combinations thereof, and the like. The blob files can include a blob file abstract 910 contains data referred to by the second level compact indices, such that the blob file abstract 910 can identify a valid data block in accordance with the offsets provided in second level compact index 904.

Figure 10:
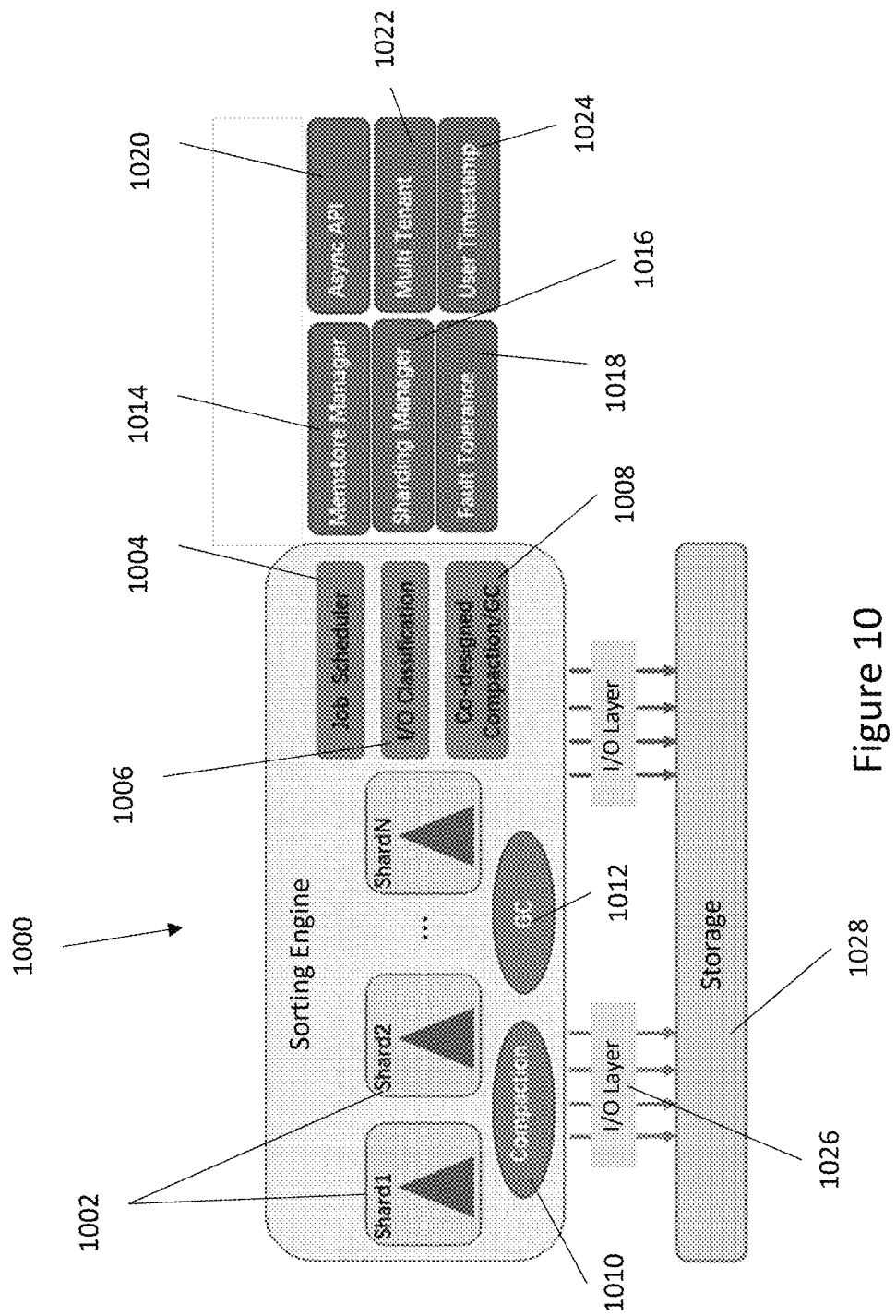
FIG. 10 shows a sorting engine according to an embodiment.

FIG. 10 shows a sorting engine according to an embodiment. Sorting engine 1000 is configured to organize and manage data to support range scans and reduce the write amplification and latency of such processes. Sorting engine 1000 includes shards 1002, job scheduler 1004, I/O classification 1006, Co-designed compaction and garbage collection 1008, compaction 1010, and garbage collection 1012. Sorting engine 1000 can further include memstore manager 1014, sharding manager 1016, fault tolerance 1018, asynchronous API 1020, multiple tenant module 1022, and timestamp manager 1024. Input/output (I/O) layers 1026 can communicate with storage 1028.

Sorting engine 1000 is configured to generate shards 1002 to split data from large LSM tree structures into smaller LSM tree structures within the shards 1002. The sharding of the LSM tree structure reduces a number of layers of each tree, thereby reducing write amplification. Partitioning of the LSM tree into the shards 1002 can be performed by sharding manager 1016.

Job scheduler 1004 refers to a component or module that is programmed, designed, or otherwise configured to cooperate with to ensure stable latency for individual I/O operations to- and from-storage. Job scheduler 1004 can be configured to reduce or avoid adverse conditions, such as write stalls or write stops to enhance or even optimize data retrieval and reduce tail latency. Job scheduler 1004 can be configured to differentiate different background tasks based on their priority and allocate different I/O bandwidth resources to them. In an embodiment, background tasks can be categorized into three different priority types. In this embodiment, job scheduler 1004 can prioritize ensuring fast Flush, meaning Flush operations have the highest priority. A fast Flush clears enough space in the memory's write buffer to accommodate foreground write requests in a timely manner. The speed of Flush directly affects the latency of write tail. In this embodiment, L0 to L1 compaction tasks can have the second priority. If L0 to L1 Compaction is slow, it directly increases the number of read I/O operations, thereby extending the read latency tail. In this embodiment, the priority of L1 to L(N) compaction can be set as the lowest priority. These compaction tasks are primarily used to maintain the form of LSM tree and do not have a significant impact on read and write latency in the short term.

Prioritizing flush processes can reduce the instances of write stalls or write stops, as the main cause of these issues is the write buffer becoming full. Accordingly, maintaining flush speed reduces write stalls and write stops.

In sorting engine 1000, read I/O amplification can be influenced by the number of L0 files. An increase in the number of L0 files can occur due to slow L0 to L1 compaction, which can be caused by, for example, queuing delays for L0 to L1 compaction when higher-level compactions are ongoing and/or concurrent higher-level compactions seizing the I/O bandwidth of L0 to L1 compaction. Accordingly, the L0 to L1 compactions can be given priority over other compactions by job scheduler 1004.

I/O classification 1006 may implement a priority classification and scheduling approach that includes collecting performance metrics, such as request latency and disk I/O throughput, to analyze the patterns of different operations. By recognizing patterns such as sequential or random access, appropriate priorities may be assigned, to I/O operations, such as three tiers of "high," "medium," and "low." In an embodiment, an adaptive mechanism can continuously adjust the priorities based on real-time observations and the historical impact of priority assignments. Machine learning techniques may enhance prediction accuracy and priority adjustment. A thread pool allocation system can dynamically allocate threads to different priority levels, ensuring high-priority tasks are executed promptly. In an embodiment, manual user overrides can further be provided to handle exceptional cases.

Further, a function to adjust priority may utilize a request and collect performance metrics, and based on recognized patterns, appropriate priority levels may be assigned to the request. The actual implementation of collecting performance metrics and recognizing patterns includes measuring and analyzing various metrics to make informed priority decisions. Further still, to enhance pattern detection and priority assignment, machine learning techniques including clustering, anomaly detection, time series analysis, decision trees, neural networks, gradient boosting, principal component analysis, reinforcement learning, and self-organizing maps may be employed. These methods collectively offer versatile tools for effective adaptive behavior recognition and priority allocation.

Co-designed compaction and garbage collection 1008 can cooperate with a file system to reduce end-to-end write amplification by carrying out compaction and garbage collection in coordination with garbage collection in the file system. The co-designed compaction and garbage collection 1008 can operate according to, for example, zone usage information from said file system.

Compaction 1010 is configured to perform compaction tasks within the sorting engine 1000. Garbage collection 1012 is configured to perform garbage collection tasks within the sorting engine 1000. The compaction 1010 and garbage collection 1012 can be controlled to operate according to the outputs of job scheduler 1004, I/O classification 1006, and/or co-designed compaction and garbage collection 1008.

Memstore manager 1014 is a module for memory management. Memstore manager 110 can include any suitable hardware, software, and combinations thereof for performing the management of memory, for example managing memory when generating shards 1002 according to sharding manager 1016.

Sharding manager 1016 is a component or module that is programmed, designed, or otherwise configured to split, automatically or manually, data in a large LSM tree structure into smaller LSM tree structures, such as shards 1002. The sharding performed by sharding manager 1016 thereby reduces the total number of layers in the LSM tree, reducing write amplification. The sharding manager 1016 can, when data within an LSM tree structure reaches a certain threshold, split the LSM tree into shards 1002, or large shards 1002 into smaller separate shards 1002. Conversely, when the data within a data structure decreases due to deletions, and the volume thereof falls below a specific threshold, the sharding manager can merge adjacent shards to form a single larger shard, for example when respective data volumes for the shards to be merged is beneath a predetermined threshold value.

Sharding manager 1016 can be configured to ensure the atomicity of a split operation such that the split operation either succeeds entirely or fails completely, without splitting any data in a respective shard while failing with other data. Any failed operations are then rolled back to maintain data integrity. Sharding manager 1016 can be configured to operate so as to reduce impact on front-end I/O operations, for example by maintaining the total number of LSM levels within a fixed range. As discussed above, the partitioned LSM advantageously reduces read and write amplification over a regular LSM since each partition is itself an independent LSM tree, thus requiring management of smaller data volumes with fewer layers, leading to less read and write-ahead files. The partitioned LSM provided by sharding manager 1016 can also allow for more aggressive tiering compaction to reduce WAF, facilitate tenant isolation and adaptive strategies, making it easier to implement adaptive policies such as different compaction strategies for various partitions, and control tenant isolation, thereby achieving better trade-offs for workloads with locality characteristics while reducing write amplification without compromising read performance.

Fault tolerance 1018 is a component or module that is programmed, designed, or otherwise configured to provide sector-level fault tolerance capabilities so that single sector corruption within a file does not affect data consistency and visibility. To prevent individual sector damage on disks from rendering specific files or data unreadable, which can result in the entire database data for the upper-layer distributed system requiring reconstruction, data redundancy blocks for critical file data can generated to ensure that the data of a file is able to be correctly recovered even if several consecutive sectors within the file are damaged. Alternately or additionally, the file system can provide redundancy protection for metadata to prevent the unavailability of metadata from rendering the entirety of the file system unreadable.

Asynchronous API 1020 is a component or module that is programmed, designed, or otherwise configured to manage I/O operations to- and from-storage, so that I/O waiting does not block upper layer threads from executing other tasks. Asynchronous API 1020 can collaborate with an underlying file system to alleviate blocking of I/O operations, thereby improving parallelism, latency, and response time, by collaborating to select an executor for executing asynchronous tasks and asynchronous task callbacks.

Multiple tenant module 1022 a component or module that is programmed, designed, or otherwise configured to provide shard-level resource limitations and isolation since upper layer applications, e.g., L0 or L1, may have different resource usage limits for different shards. Non-limiting examples of such resources include I/O bandwidth, memory size, and the number of threads, e.g., a number of asynchronous I/O execution threads/compaction threads, since upper-level applications are configured to have resource usage caps for various engines and shards. Additionally, multi-tenant manager 140 is programmed, designed, or otherwise configured to provide periodic monitoring and resulting statistics regarding usage of each resource type, allowing an upper layer to dynamically adjust quota values for each resource type on different shards based on their resource monitoring status, thus facilitating multi-tenancy functionality. Multiple tenant module 1022 can be designed, or otherwise configured to monitor real-time resource usage status for each shard so that, e.g., an upper layer application may dynamically adjust quota values for each shard accordingly, to thereby maximize resource utilization.

Timestamp manager 1024 a component or module that is programmed, designed, or otherwise configured to timestamp each key-value pair, automatically or manually. These timestamps can be utilize to enable implementation of multi-version concurrency control (MVCC)-related features. Timestamp manager 1024 can be configured such that upper layer applications, for example L0 or L1, have timestamp values that strictly increase over time for a same key, to thereby ensure expected behavior during a reading process. A user timestamp may be combined with a user key and stored as a unified key within sorting engine 1000. During encoding, a timestamp may be used to ensure that internal keys in sorting engine 1000 are sorted first. Functionalities of timestamp manager 1024 can be supported by read, write, and delete functions. For example, timestamps can be associated with various operations. Garbage collection and/or compaction processes can remove expired timestamp data to facilitate data integrity, whereby proactive compaction is triggered when capacity limited are reached, thus reclaiming storage space. Timestamp manager 1024 as described and recited herein, significantly enhances robustness and efficiency, providing comprehensive support for timestamp management, ensuring data integrity, and optimizing storage utilization.

Figure 11:
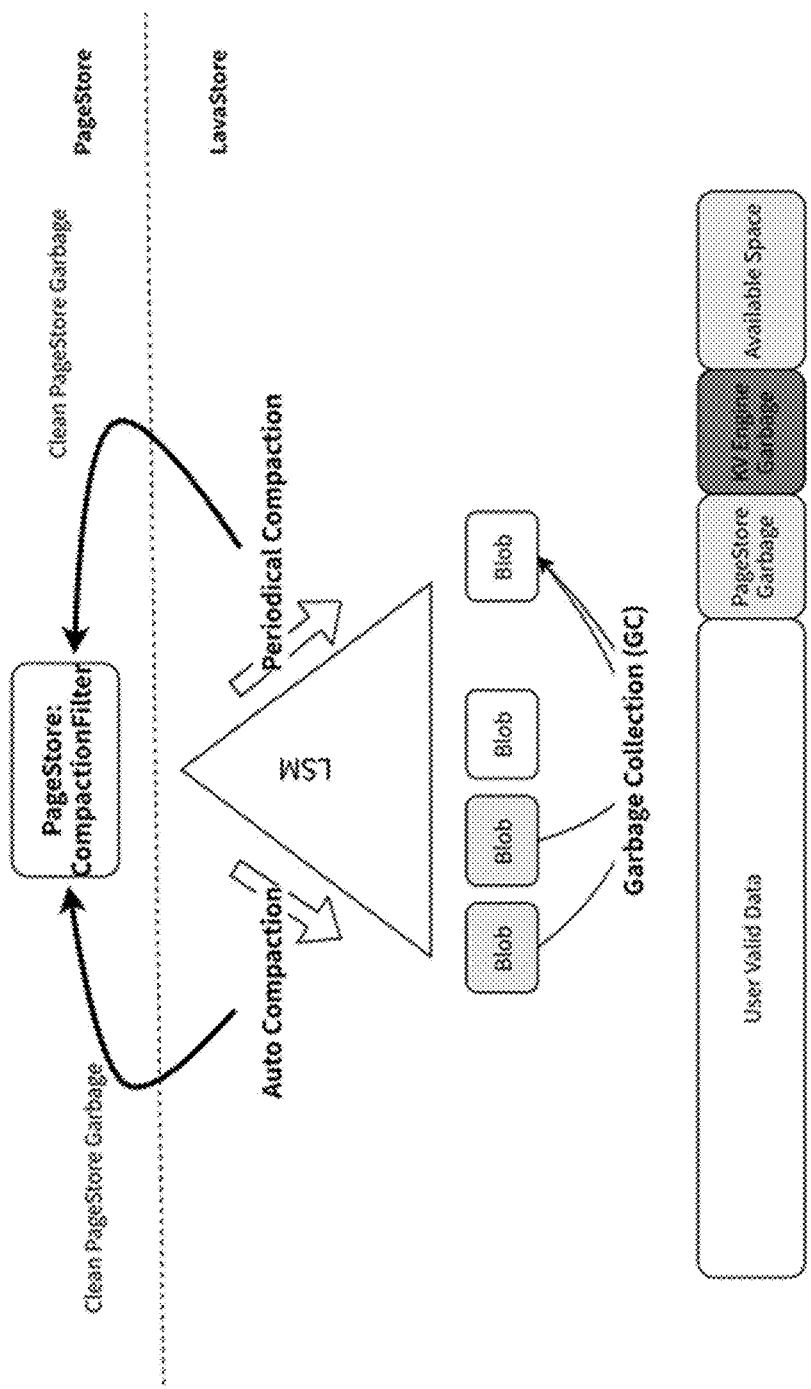
FIG. 11 shows a garbage collection module according to an embodiment.

FIG. 11 shows a garbage collection module according to an embodiment. The garbage collection module of FIG. 11 is configured to reduce unnecessary data movement during garbage collection and compaction. In particular, the garbage collection module can provide periodic compaction to clean up expired pages of applications. The periodic garbage collection can include merging multiple layers of the same page from the LSM tree into the last layer, and the upper layers can perform corresponding functions during the compaction process. This can reduce the amount of data being handled during garbage collection. The garbage collection can also be made more accurate and precisely scheduled by being based on garbage rates at an entry level instead of at a space level. This can be achieved by selecting a blob file with the highest garbage space for garbage collection. By performing this calculation at the entry level, the selection of the blob file with the highest garbage space can be ensured, resulting in more efficient GC operations. The garbage collection strategy can be further improved, for example having the strategy account for a wider range of scenarios, thereby improving concurrency during high-water levels, and improving space reclamation.

In an embodiment, the garbage collection can be configured to reduce the associated read amplification by periodic compaction to reduce unnecessary data movement during garbage collection for application data that has expired but is not recognized by the KV side pages. The amount of application garbage data within an SST can be determined by providing an API that allows the application to handle the specific decision-making process for determining the amount of application garbage data. For example, table property information from the data can be utilized to calculate the amount of garbage data. At a specific point in time, if the recyclable log sequence number (LSN) of a segment exceeds a threshold, it indicates that all the data within that segment of the SST is considered garbage. By comparing the segment IDs and aggregating the results, the precise size of the garbage data in the entire SST can be determined. It is important to note that the size of the garbage data mentioned here does not refer to the size of the garbage data within the SST itself, but rather the size within the corresponding Blob, accurately reflecting the total amount of garbage data. This can be the data that is then subjected to the garbage collection operation.

Figure 12A:
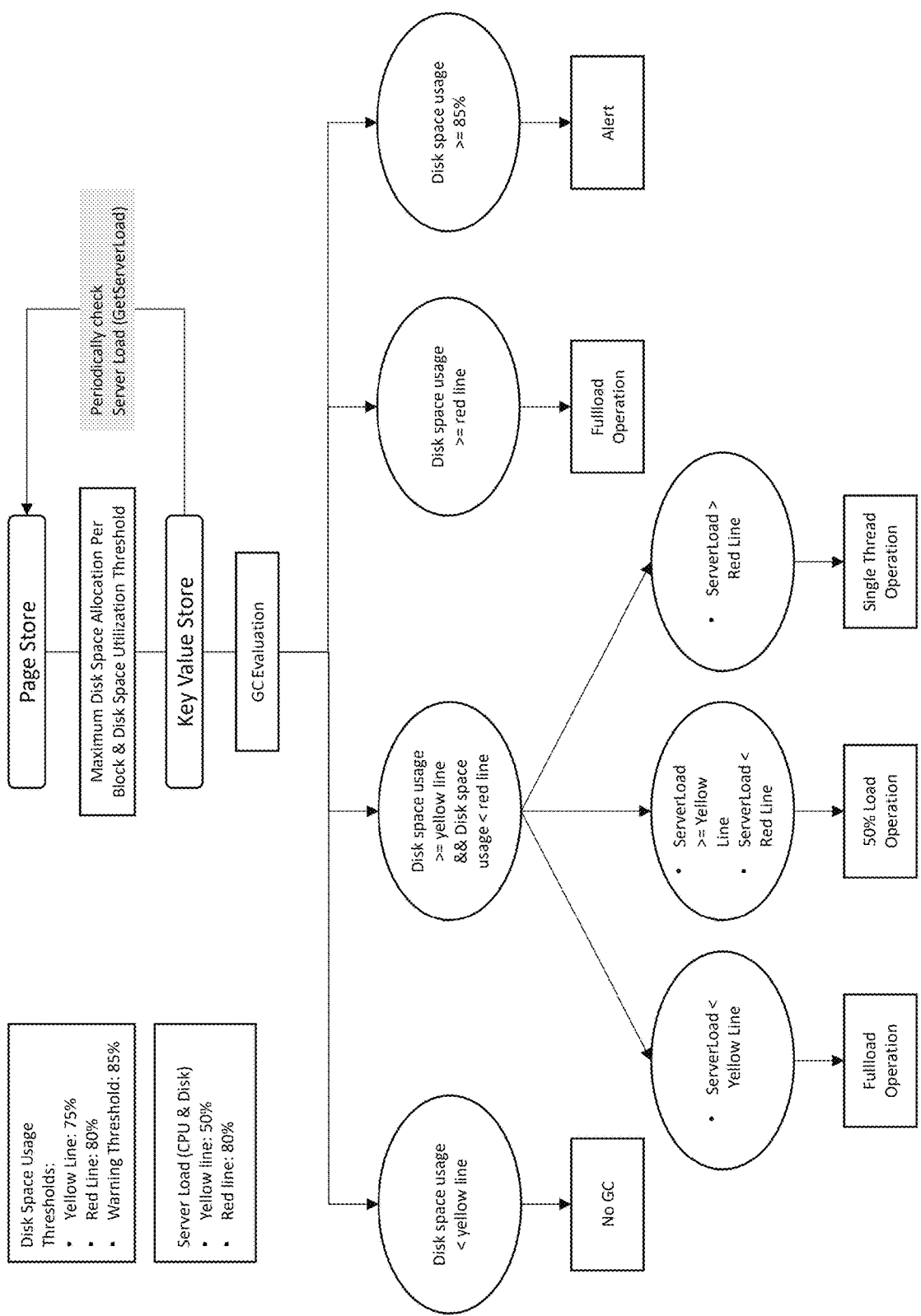
FIG. 12A shows a garbage collection process according to an embodiment.
Figure 12B:
FIG. 12B shows a garbage collection process according to an embodiment.

FIGS. 12A and 12B show garbage collection processes according to embodiments. The adaptive garbage collection can include determining capacity usage and/or an available capacity, for example by interfacing with the file system. This can allow scanning of the sizes of all files in the current directory of the instance, so that we can perceive capacity usage. The adaptive garbage collection process can include adjustment of garbage collection thresholds, bandwidth, and concurrency based on available capacity. For example, based on the capacity situation, garbage ratio thresholds and the number of GC threads can be adjusted according to pre-designed strategies. FIG. 12B shows the garbage collection process of FIG. 12A where there are multiple garbage collection threads, the threads being allocated to resources and operated based on the respective extents of utilization of those resources compared to thresholds.

Figure 13:
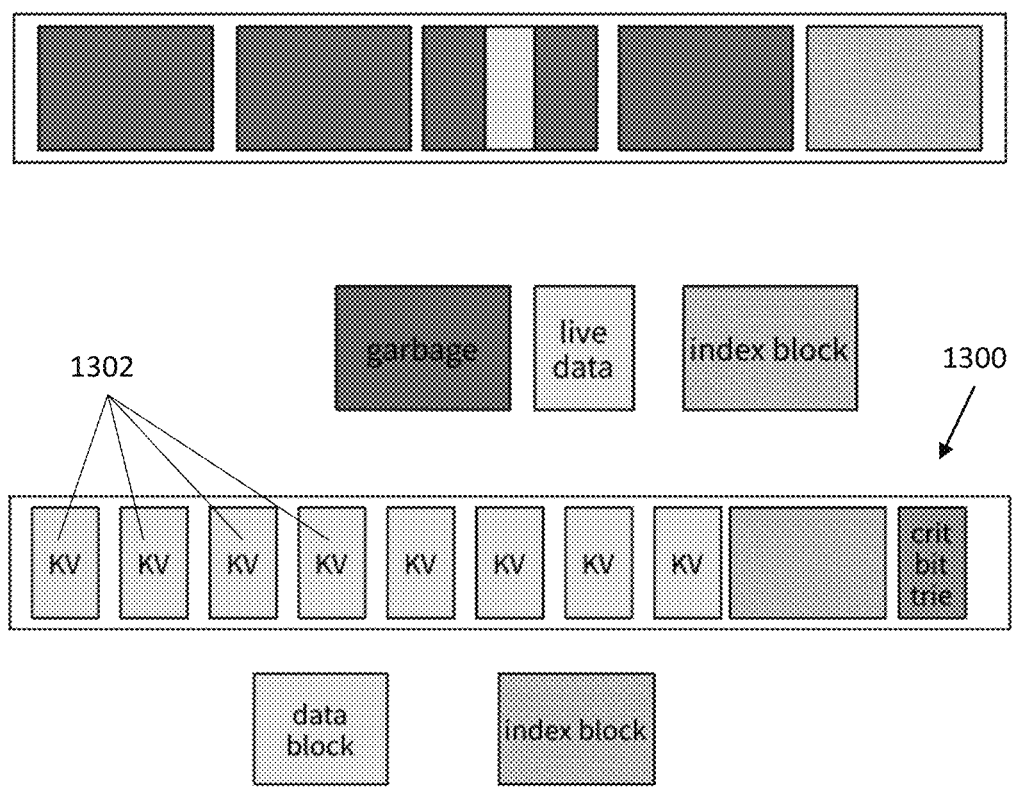
FIG. 13 shows a storage model for garbage collection according to an embodiment.

FIG. 13 shows a storage model for garbage collection according to an embodiment. In the storage model of FIG. 13, a complete, redundant set of keys 1302 are stored at an end of the SST file 1300. The existence of the redundant set of keys 1302 obviates the need to scan the entire SST file 1300 during the backward check in garbage collection, which requires examining the validity of all keys, which otherwise would require scanning the entire SST from start to finish. During garbage collection, only the redundant set of keys 1302 at the end of SST file 1300 needs to be read. For invalid keys, the corresponding values can be skipped, while for valid keys, the respective values can be retrieved. The skipping of invalid keys can reduce read amplification by enabling the retrieval of only valid values. In FIG. 13, each key-value pair occupies a dedicated data block, and the key information stored in the index block is a complete representation of the keys in the data block. As a result, the index block contains comprehensive key information for the SST.

The file system according to embodiments can be configured to split data from logs and use log-structured append-only writing as the write model. In an embodiment, the file system can further provide pre-allocated data space where sync writes only occur for the persistence of data, and in an embodiment, do not need to make metadata persistent. In an embodiment, the data persistence for different files and global log persistence can be executed separately. These aspects of the file system can allow the file system to avoid some metadata persistence operations, such as those caused by single data write persistence operations.

The file system according to embodiments supports general files and instant files. Both general and instant files can be written sequentially, and both can be read either sequentially or randomly. General files can be optimized for consistently low latency in either sequential or random reads. General files can be used for writing data in batches that do not require flushing the data to disk after each write, such as SST files. The storage space is allocated in large units, with a non-limiting example of unit size being 1 MB each. The large allocation unit can reduce metadata size for general files, such that metadata of all general files can be kept in memory during normal file system operation. By keeping the metadata in memory, no read operation to general files would require further I/O for metadata access, regardless of the read offset. This can reduce read tail latency for general files. Instant files can be optimized for fast, incremental synchronous writes while having good sequential and random read performance near the tail. Instant files can be used for writing data that requires frequent flushing to disk for instant durability, such as write-ahead log files of the key-value system. The data and metadata of each individual write can be bundled together for instant files. The bundled data and metadata can be written to a journal file shared by all instant files. The bundling of data and writing to the journal file can improve the speed of incremental write and sync operations. This approach is structured to support sequential reads, but can have tradeoffs regarding random reads. Since instant files are expected to be mostly read sequentially, with random reads mostly concentrated near the tail most recently written data of each instant file that is actively being written can be cached to improve read performance.

Figure 14:
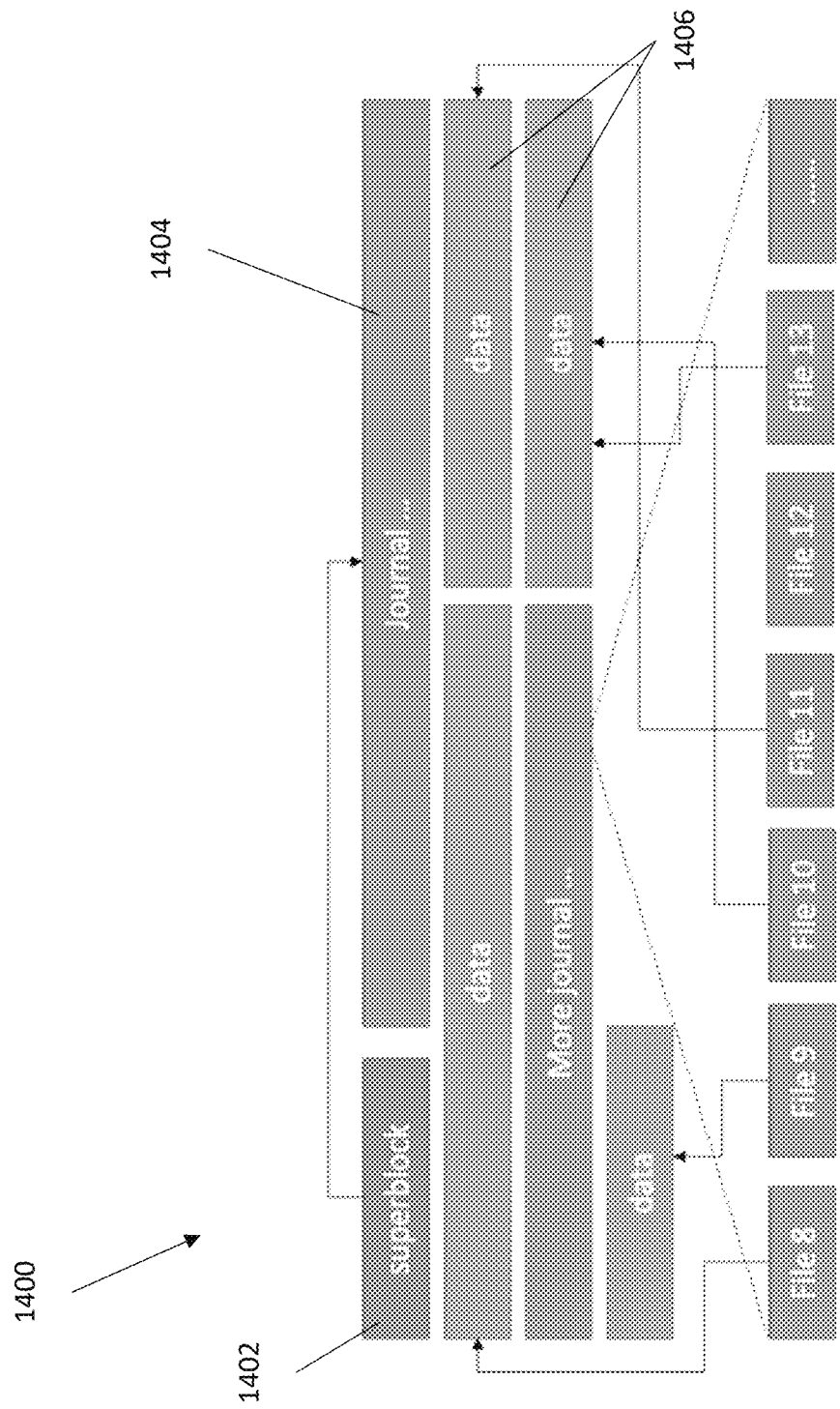
FIG. 14 shows a disk layout for a file system according to an embodiment.

FIG. 14 shows a disk layout for a file system according to an embodiment. FIG. 14 can be used as the disk layout for any file system as described herein, such as file systems 114 and 210 as described above and shown, respectively, in FIGS. 1 and 2. The file system 1400 includes three distinct types of data: superblock 1402, journal 1404, and data 1406. Superblock 1402 includes essential global file system metadata, including journal index node (inode) content, universal unique identifier (UUID) data, version information, block size, and other pertinent parameters. It is strategically positioned, in an embodiment at the second 4 KB of the storage device, with the strategic positioning of superblock 1402 being selected to improve accessibility and coordination with other data components. Journal 1404 is data capturing a most recent checkpoint from the file system's operation log. The journal 1404 can be effectively replayed during the file system's mount process, improving the process of recovery for the in-memory file metadata. Lastly, the data 1406 is dedicated to storing the actual content of individual files within the file system. In an embodiment, each data block is organized as a contiguous range of Logical Block Addresses (LBAs).

Figure 15:
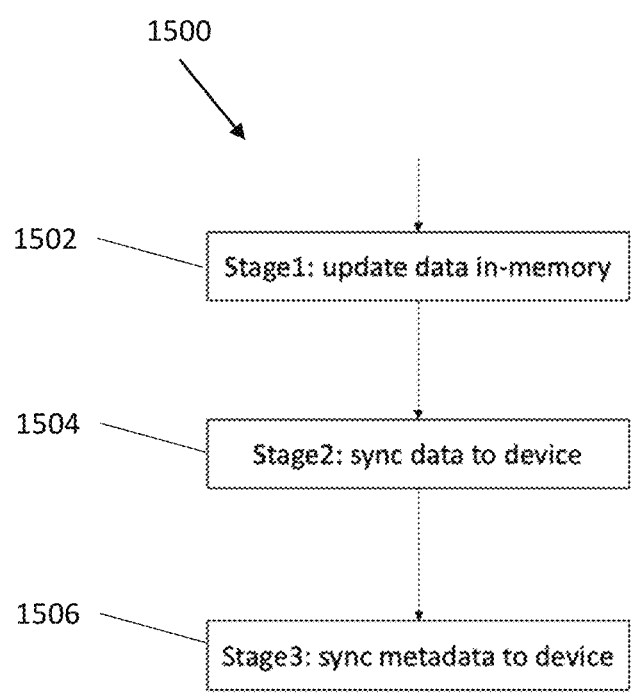
FIG. 15 shows a method of flushing file metadata changes and log records during disk runtime.

FIG. 15 shows a method of flushing file metadata changes and log records during disk runtime. Method 1500 includes updating data in-memory 1502, syncing data to a device 1504, and syncing metadata to the device 1506. Updating data in-memory at 1502 includes using an operation to append data to the file's internal write buffer. As data is appended, the system checks if the write buffer's length has reached the designated threshold, with a non-limiting example of such a threshold being 512 KB. If the threshold is met, the data is flushed to the storage device. The data can be flushed to the storage device by syncing the data to the device at 1504. Syncing the data to the device at 1504 can include performing a flush operation, in which data in the write buffer is written to the storage device. Additionally, syncing the data to the device at 1504 can include marking of the file and adding said file to a global marked file list, indicating that the file has pending changes. Further, the metadata can be synced to device at 1506. The syncing of the metadata to the device at 1506 can be performed by calling a function for ensuring data persistence. The function can force the write of the file's internal write buffer to the storage device, making sure that the data is securely stored. The function can be an "fsync( )" function. In an embodiment, all marked records marked during syncing of data to the device at 1504, subsequent to the last syncing of log data can be synchronized to the journal file on the device. This step helps maintain the durability and consistency of file metadata changes in various computing environments. Additionally, at the syncing of the metadata to the device at 1506, transaction records for the marked files can be updated. The transaction records can be formatted as described in the preceding section and subsequently flushed to the journal file. This process can ensure the durability and consistency of file metadata changes, enhancing the reliability and performance of the key-value store and file system in various computing environments.

Figure 16:
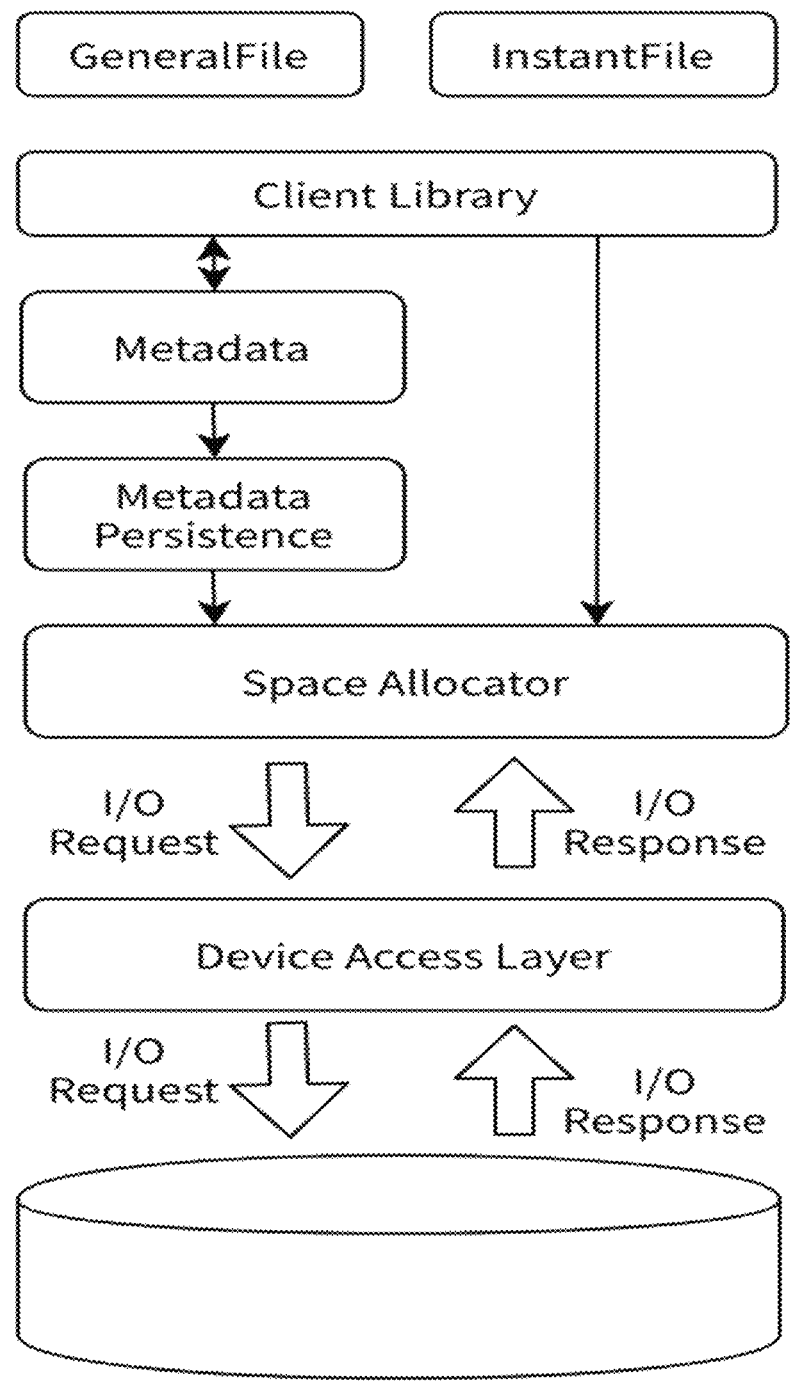
FIG. 16 shows I/O flow paths for a file system according to an embodiment.

FIG. 16 shows I/O flow paths for a file system according to an embodiment. The file system can include a user-space I/O scheduler to assign I/O priority to different I/O types. The I/O scheduler can mark foreground I/O as high priority while background I/O can be marked as low priority. In addition, the key-value system includes a scheduler to schedule its background tasks in order to ensure that each I/O issued by the upper layer applications has a consistent I/O amplification. Through this co-design of I/O scheduling in both key-value system and file system, the tail latency can be kept stable and low as both the I/O amplification and I/O latency are consistent. Moreover, reading general files from the file system requires no I/O for metadata 1606, and the controlled size for general files can ensure that most reads require a single I/O operation. The file system can update data without requiring metadata updates using an "fdatasync" operation. The user data can be updated without synchronizing file size unless a new chunk of the controlled size for general file is required. This optimization reduces unnecessary synchronization of file metadata, resulting in improved performance, enhanced data consistency, and an overall write amplification factor reduction by 1 in the log engine, without compromising synchronization tasks. The file system can utilize a specialized file type to support efficient sync i/o. The file system can store the log engine's data in the specialized type of files on disk, which allows for compaction tasks. The file system can coordinate garbage collection with a key-value system, for example by exposing zone usage information to the key-value system, which can use this information to decide which file to run compaction or garbage collection. The key-value system can be configured to set priority to file system's I/O scheduler. For example, the key-value system can mark the foreground I/O as high priority while the background I/O will be marked as low priority for the file system. In addition, the key-value system can schedule its background tasks such that each I/O issued by the upper layer applications has a consistent I/O amplification. Through this co-design of key-value system and file system, the tail latency can be kept stable and low as both the I/O amplification and I/O latency are consistent. Moreover, reading general files 1600 requires no I/O for metadata, and the defined sizes, such as 1 MB each, ensures most reads require a single I/O.

Figure 17:
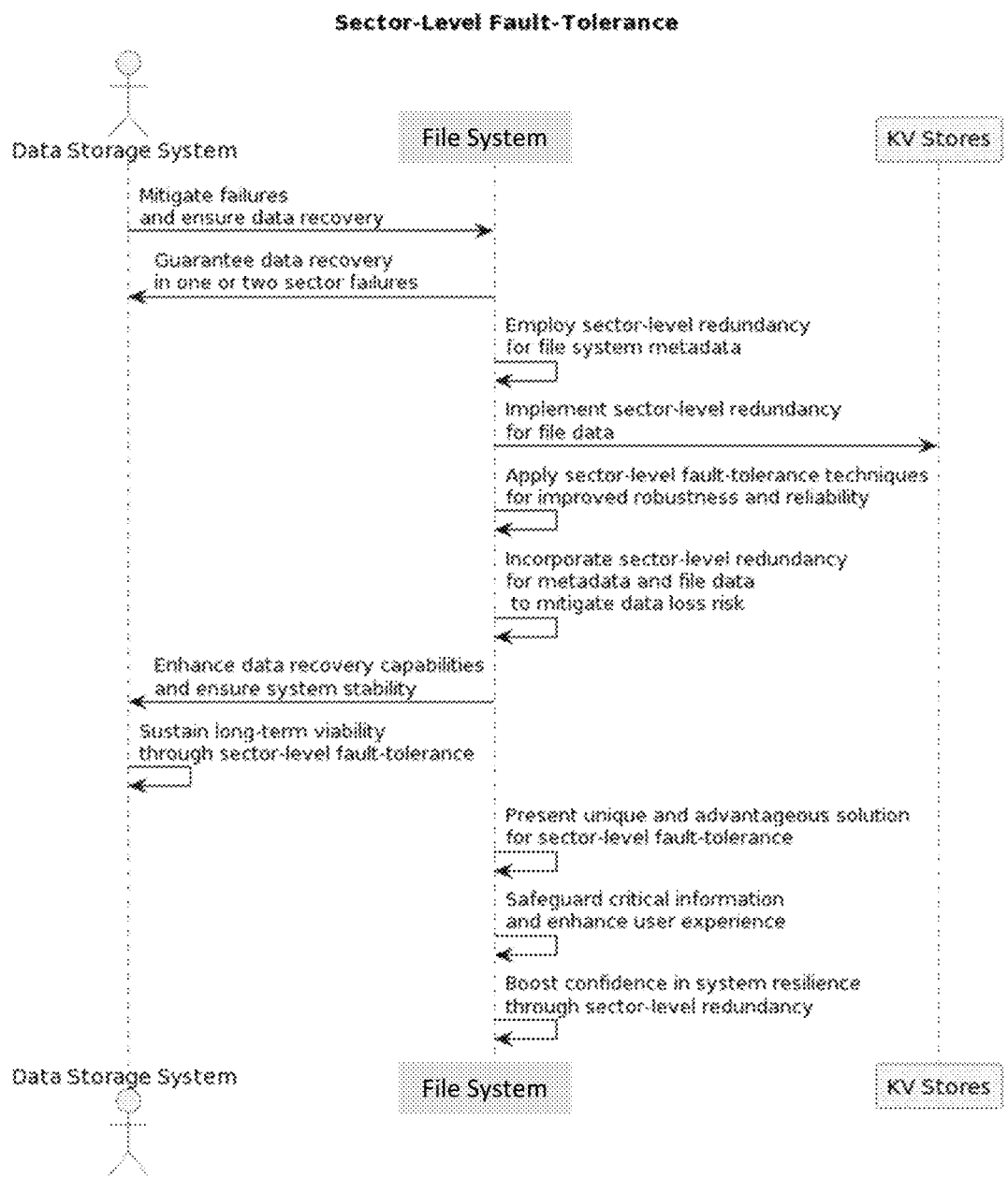
FIG. 17 shows fault redundancy in a file system according to an embodiment.

FIG. 17 shows fault redundancy in a file system according to an embodiment. FIG. 17 shows interactions between the data storage system, the file system, and the key-value stores. The file system, as shown in FIG. 17, is configured to provide sector-level redundancy for file system metadata. The structuring of the file system allows data recovery from the data storage system within one or two sector failures. In an embodiment, the key-value system is configured to provide data to the file system to achieve sector-level redundancy for the file data of the key-value stores. The sector-level redundancy can reduce the blast radius of failures, thus reducing the impact thereof.

Figure 18:
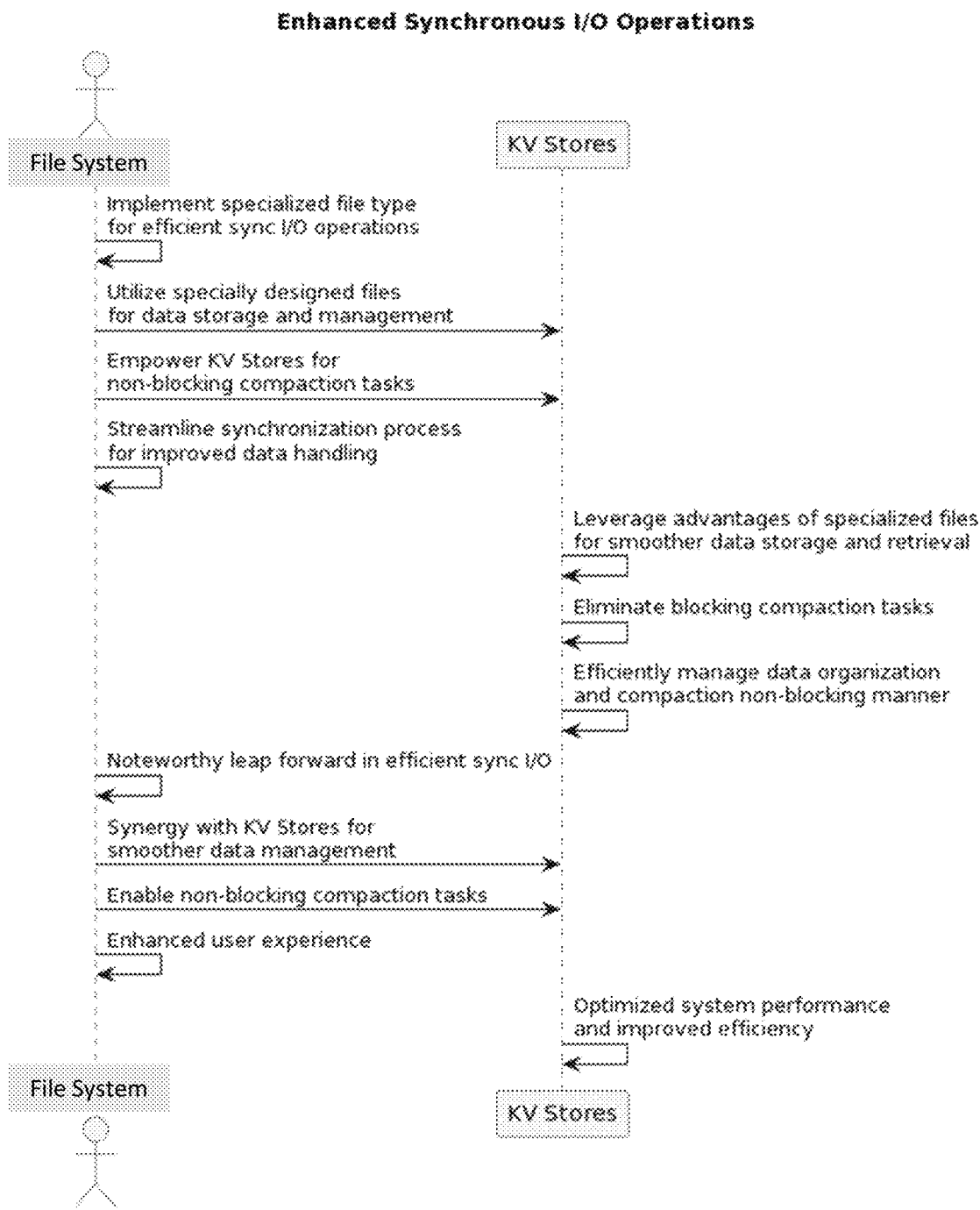
FIG. 18 shows synchronous I/O operations in a file system according to an embodiment.

FIG. 18 shows synchronous I/O operations in a file system according to an embodiment. Though using ordinary file syncing can reduce latency, this operation includes two write operations, one to update metadata and another to update data. File system and key-value systems according to embodiments can use a file data sync, updating the data without updating metadata. By reducing unnecessary synchronization of file metadata, use of the file data sync operation can result in improved performance, enhanced data consistency, and an overall Write Amplification Factor (WAF) reduction by 1 while successfully carrying out the essential synchronization tasks. The key-value system can keep data from the log engine in file types specialized for sync I/O efficiency. The use of these specialized files can further empower the key-value stores for non-blocking compaction tasks, as shown in FIG. 18. The file system and the key-value system can also collaborate to reduce write amplification, for example by the file system exposing zone usage information to the key-value system. The key-value system can utilize the zone usage information to make decisions regarding compaction and/or garbage collection operations.

Aspects

Aspect 1. A system, comprising a key-value system, a file system, and a collaboration layer, wherein:
the key-value system includes:
a log engine configured to provide concurrent writing of multiple log files,
a hash engine configured to address point queries by storing index information in a compact index, and
a sorting engine configured to address range scans by using partitioned log-structured merge (LSM) trees;
the file system includes a log-structured append-only write model; and
the collaboration layer is configured to facilitate collaboration between the key-value system and the file system.

Aspect 2. The system according to aspect 1, wherein the file system is configured to update data based on the key-value system without updating metadata associated with said data.

Aspect 3. The system according to any of aspects 1-2, wherein the key-value system is configured to provide data to the file system to make said data persistent within the file system.

Aspect 4. The system according to any of aspects 1-3, wherein the hash engine is configured to retain the compact index in a cache memory.

Aspect 5. The system according to aspect 4, wherein the index information is compressed.

Aspect 6. The system according to any of aspects 4-5, wherein the index information retained in the cache memory is partial index information selected by omitting some of the index information according to a least recently used strategy.

Aspect 7. The system according to any of aspects 1-6, wherein the log engine is configured to consolidate multiple user operations into a single I/O operation to be performed with the file system.

Aspect 8. The system according to aspect 7, wherein the consolidation of the multiple user operations includes placing the multiple user operations into a queue, and flushing the queue to the file system on occurrence of a predetermined condition.

Aspect 9. The system according to any of aspects 1-8, wherein the sorting engine is configured to split data from a first LSM tree into a plurality of shards, each of the shards containing a second LSM tree having fewer layers than the first log-structured merge tree.

Aspect 10. The system according to aspect 9, wherein the sorting engine includes a job scheduler, the job scheduler configured to prioritize flush operations and level zero to level one compaction operations.

Aspect 11. The system according to any of aspects 9-10 wherein the sorting engine includes a sharding manager, configured to direct the splitting of data such that each of the second LSM trees have a number of levels that is within a predetermined range.

Aspect 12. The system according to any of aspects 9-11, wherein the sorting engine includes a timestamp manager configured such that level zero or level one applications have timestamp values that strictly increase over time for a same key.

Aspect 13. The system according to any of aspects 1-12, wherein the key-value system further comprises a garbage collection module configured to merge multiple layers of an LSM tree into a last layer of said LSM tree.

Aspect 14. The system according to aspect 13, wherein the collaboration layer is configured to coordinate garbage collection operations across the key-value system and the file system.

Aspect 15. The system according to aspect 14, wherein coordinating the garbage collection operations includes the file system exposing zone usage information to the key-value system, and the key-value system utilizing the zone usage information to determine a file to be subjected to compaction or garbage collection.

Aspect 16. The system according to any of aspects 14-15, wherein the garbage collection module is configured to determine a size of garbage data within a blob file based on an SST file associated with said blob file.

Aspect 17. The system according to aspect 16, wherein the SST file contains redundant keys at an end of said SST file.

Aspect 18. The system of claim 1, wherein the file system contains superblock, journal, and data components, the superblock component containing general file system metadata, and the journal containing a checkpoint of a file system operating log.

Aspect 19. The system according to any of aspects 1-18, wherein the key-value system includes a scheduler configured to schedule background tasks such that each input/output (I/O) request issued by upper layer applications has a consistent I/O amplification.

Aspect 20. The system according to any of aspects 1-19, wherein the system is configured to handle instant files and general files, wherein the file system allocates storage space for the general files in predefined extents.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:
performing concurrent writing of multiple log files,
addressing point queries by storing index information in a compact index,
addressing, using partitioned log-structured merge (LSM) trees, range scans,
merging multiple layers of an LSM tree into a last layer of said LSM tree, and
determining a size of garbage data within a binary large object (blob) file based on a sorted string table (SST) file associated with the blob file.

2. The method of claim 1, comprising:
updating data without updating metadata associated with said data.

3. The method of claim 1, comprising:
providing data to make said data persistent within files of the multiple log files.

4. The method of claim 1, comprising:
retaining the compact index in a cache memory.

5. The method of claim 4, wherein the index information is compressed.

6. The method of claim 4, wherein the index information retained in the cache memory is partial index information selected by omitting some of the index information according to a least recently used strategy.

7. The method of claim 1, comprising:
consolidating multiple user operations into a single I/O operation to be performed.

8. The method of claim 7, wherein the consolidation of the multiple user operations includes placing the multiple user operations into a queue, and flushing the queue on occurrence of a predetermined condition.

9. The method of claim 1, comprising:
splitting data from a first LSM tree into a plurality of shards, each of the shards containing a second LSM tree having fewer layers than the first LSM tree.

10. The method of claim 9, comprising:
prioritizing flush operations and level zero to level one compaction operations.

11. The method of claim 9, comprising:
directing the splitting of data such that each of the second LSM trees have a number of levels that is within a predetermined range.

12. The method of claim 9, wherein level zero or level one applications have timestamp values that strictly increase over time for a same key.

13. The method of claim 1, comprising:
coordinating garbage collection operations.

14. The method of claim 13, wherein coordinating the garbage collection operations includes exposing zone usage information and utilizing the zone usage information to determine a file to be subjected to compaction or garbage collection.

15. The method of claim 1, wherein the SST file includes redundant keys at an end of said SST file.

16. The method of claim 1, wherein a file system in which the method is performed contains superblock, journal, and data components, the superblock component including general file system metadata, and the journal including a checkpoint of a file system operating log.

17. The method of claim 1, comprising:
scheduling background tasks such that each input/output (I/O) request issued by upper layer applications has a consistent I/O amplification.

18. The method of claim 1, wherein files processed by the method include instant files and general files, wherein the method comprises:
allocating storage space for the general files in predefined extents.

19. A system comprising:
one or more computers and one or more storage devices on which are stored instructions that are operable, when executed by the one or more computers, to cause the one or more computers to perform operations comprising:
performing concurrent writing of multiple log files,
addressing point queries by storing index information in a compact index,
addressing, using partitioned log-structured merge (LSM) trees, range scans, merging multiple layers of an LSM tree into a last layer of said LSM tree, and determining a size of garbage data within a binary large object (blob) file based on a sorted string table (SST) file associated with the blob file.

20. One or more non-transitory computer storage media encoded with computer program instructions that when executed by one or more computers cause the one or more computers to perform operations comprising:

performing concurrent writing of multiple log files, addressing point queries by storing index information in a compact index, addressing, using partitioned log-structured merge (LSM) trees, range scans, merging multiple layers of an LSM tree into a last layer of said LSM tree, and determining a size of garbage data within a binary large object (blob) file based on a sorted string table (SST) file associated with the blob file.

* * * * *